(12) United States Patent
Holzer et al.

(10) Patent No.: US 10,586,378 B2
(45) Date of Patent: Mar. 10, 2020

(54) STABILIZING IMAGE SEQUENCES BASED ON CAMERA ROTATION AND FOCAL LENGTH PARAMETERS

(71) Applicant: Fyusion, Inc., San Francisco, CA (US)

(72) Inventors: Stefan Johannes Josef Holzer, San Mateo, CA (US); Radu Bogdan Rusu, San Francisco, CA (US); Yuheng Ren, San Bruno, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 15/408,270

(22) Filed: Jan. 17, 2017

(65) Prior Publication Data

US 2017/0124680 A1 May 4, 2017

Related U.S. Application Data

(63) Continuation-in-part of application No. 14/530,669, filed on Oct. 31, 2014.

(51) Int. Cl.
*G06T 15/20* (2011.01)
*G06K 9/46* (2006.01)
*G06T 7/33* (2017.01)

(52) U.S. Cl.
CPC ............. *G06T 15/205* (2013.01); *G06K 9/46* (2013.01); *G06T 7/33* (2017.01); *G06T 2207/10016* (2013.01)

(58) Field of Classification Search
None
See application file for complete search history.

(56) References Cited

U.S. PATENT DOCUMENTS

| | | | |
|---|---|---|---|
| 5,926,190 A | 7/1999 | Turkowski et al. | |
| 6,252,974 B1 | 6/2001 | Martens et al. | |
| 8,078,004 B2 | 12/2011 | Kang et al. | |
| 8,401,276 B1* | 3/2013 | Choe | G01C 11/06 345/419 |

(Continued)

OTHER PUBLICATIONS

Guofeng Zhang, Wei Hua, Xueying Qin, Yuanlong Shao, Hujun Bao, "Video stabilization based on a 3D perspective camera model", Nov. 2009, Springer, The Visual Computer (2009) 25: 997.*

(Continued)

*Primary Examiner* — Robert Bader
(74) *Attorney, Agent, or Firm* — Kwan & Olynick LLP

(57) ABSTRACT

The present disclosure describes systems and processes for image sequence stabilization. According to particular embodiments, a sequence of images is obtained using a camera which captures the sequence of images along a camera translation. Each image contains at least a portion of overlapping subject matter. A plurality of keypoints is identified on a first image of the sequence of images. Each keypoint from the first image are kept track of to a second image. Using a predetermined algorithm, a camera rotation value and a focal length value are calculated from two randomly sampled keypoints on the first image and two corresponding keypoints on the second image. An optimal camera rotation and focal length pair corresponding to an optimal transformation for producing an image warp for image sequence stabilization is determined. The image warp for image sequence stabilization is constructed using the optimal camera and focal length pair.

20 Claims, 16 Drawing Sheets

(56) References Cited

U.S. PATENT DOCUMENTS

| | | |
|---|---|---|
| 2002/0094125 A1 | 7/2002 | Guo |
| 2006/0188147 A1 | 8/2006 | Rai et al. |
| 2007/0008312 A1* | 1/2007 | Zhou .................. G06T 7/80 345/419 |
| 2007/0110338 A1* | 5/2007 | Snavely ............ G06F 17/30274 382/305 |
| 2008/0106593 A1 | 5/2008 | Arfvidsson et al. |
| 2008/0152258 A1 | 6/2008 | Tulkki |
| 2008/0201734 A1 | 8/2008 | Lyon et al. |
| 2008/0225132 A1 | 9/2008 | Inaguma |
| 2008/0246759 A1 | 10/2008 | Summers |
| 2009/0263045 A1 | 10/2009 | Szeliski et al. |
| 2009/0303343 A1 | 12/2009 | Drimbarean et al. |
| 2010/0033553 A1 | 2/2010 | Levy |
| 2010/0079667 A1* | 4/2010 | Turetken .............. H04N 7/0137 348/443 |
| 2010/0171691 A1 | 7/2010 | Cook et al. |
| 2011/0254835 A1 | 10/2011 | Segal |
| 2011/0261050 A1 | 10/2011 | Smolic et al. |
| 2012/0019557 A1 | 1/2012 | Aronsson et al. |
| 2012/0147224 A1 | 6/2012 | Takayama |
| 2013/0155180 A1 | 6/2013 | Wantland et al. |
| 2013/0162634 A1 | 6/2013 | Baik |
| 2013/0250045 A1 | 9/2013 | Ki et al. |
| 2014/0087877 A1 | 3/2014 | Krishnan |
| 2014/0253436 A1 | 9/2014 | Petersen |
| 2014/0307045 A1 | 10/2014 | Richardt et al. |
| 2015/0130799 A1 | 5/2015 | Holzer et al. |
| 2015/0130800 A1 | 5/2015 | Holzer et al. |
| 2015/0130894 A1 | 5/2015 | Holzer et al. |
| 2015/0134651 A1 | 5/2015 | Holzer et al. |
| 2015/0138190 A1 | 5/2015 | Holzer et al. |
| 2015/0339846 A1 | 11/2015 | Holzer et al. |
| 2017/0018054 A1 | 1/2017 | Holzer et al. |
| 2017/0018055 A1 | 1/2017 | Holzer et al. |
| 2017/0018056 A1 | 1/2017 | Holzer et al. |
| 2017/0084001 A1 | 3/2017 | Holzer et al. |

OTHER PUBLICATIONS

Martin A. Fischler, Robert C. Bolles, "Random Sample Consensus: A Paradigm for Model Fitting with Applications to Image Analysis and Automated Cartography", Jun. 1981, ACM, Communications of the ACM, vol. 24, No. 6, pp. 381-395.*

Simon Gibson, Jon Cook, Toby Howard, Roger Hubbold, Dan Oram, "Accurate Camera Calibration for Off-line, Video-Based Augmented Reality", Oct. 1, 2002, IEEE, Proceedings of the International Symposium on Mixed and Augmented Reality (ISMAR'02).*

Krystian Mikolajczyk, Cordelia Schmid, "A Performance Evaluation of Local Descriptors", Oct. 2005, IEEE, IEEE Transactions on Pattern Analysis and Machine Intelligence, vol. 27, No. 10, pp. 1615-1630.*

Christian Weigel, Leif Lennart Kreibich, "Advanced 3D Video Object Synthesis Based on Trilinear Tensors", Jul. 1, 2006, IEEE, 2006 IEEE Tenth International Symposium on Consumer Electronics, 2006. ISCE '06.*

VideoHelp Forum, "Extract all frames from video files", Oct. 6, 2010, website, retrieved from https://forum.videohelp.com/threads/326738-Extract-all-frames-from-video-files on Jan. 3, 2018.*

Andrea Fusiello, "Specifying Virtual Cameras in Uncalibrated View Synthesis", May 2007, IEEE, IEEE Transactions on Circuits and Systems for Video Technology, vol. 17, No. 5.*

Zhengyou Zhang, Rachid Deriche, Olivier Faugeras, Quang-Tuan Luong, "A robust technique for matching two uncalibrated images through the recovery of the unknown epipolar geometry", 1995, Elsevier, Artificial Intelligence 78 (1995) 87-119.*

Tiemen Schreuder, "OTESC: Online Transformation Estimation between Stereo Cameras", Dec. 2010, Delft University of Technology, Master's Thesis.*

Noah Snavely, Steven M. Seitz, Richard Szeliski, "Modeling the World from Internet Photo Collections", Nov. 2008, Springer, International Journal of Computer Vision, vol. 80, Issue 2, pp. 189-210.*

* cited by examiner

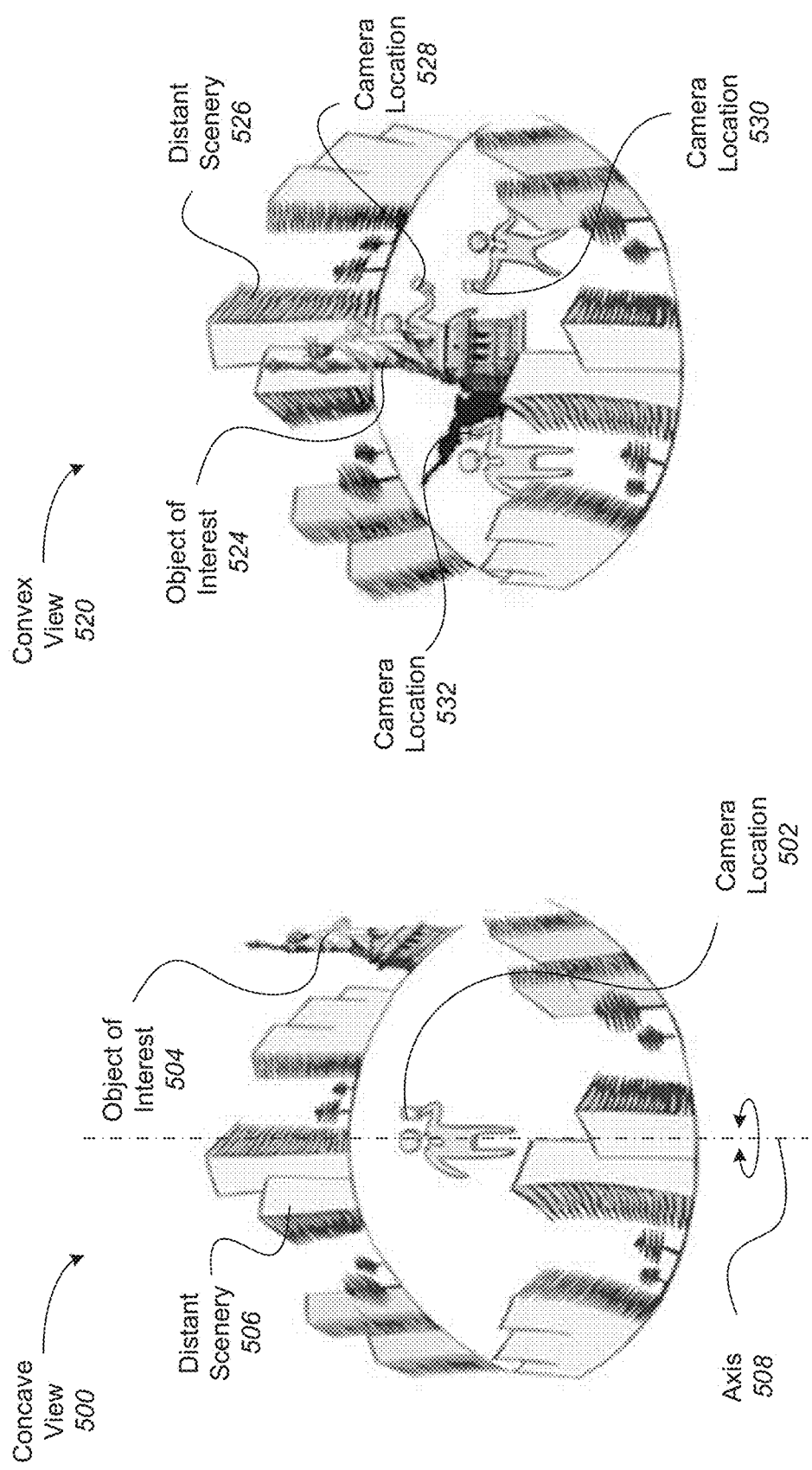

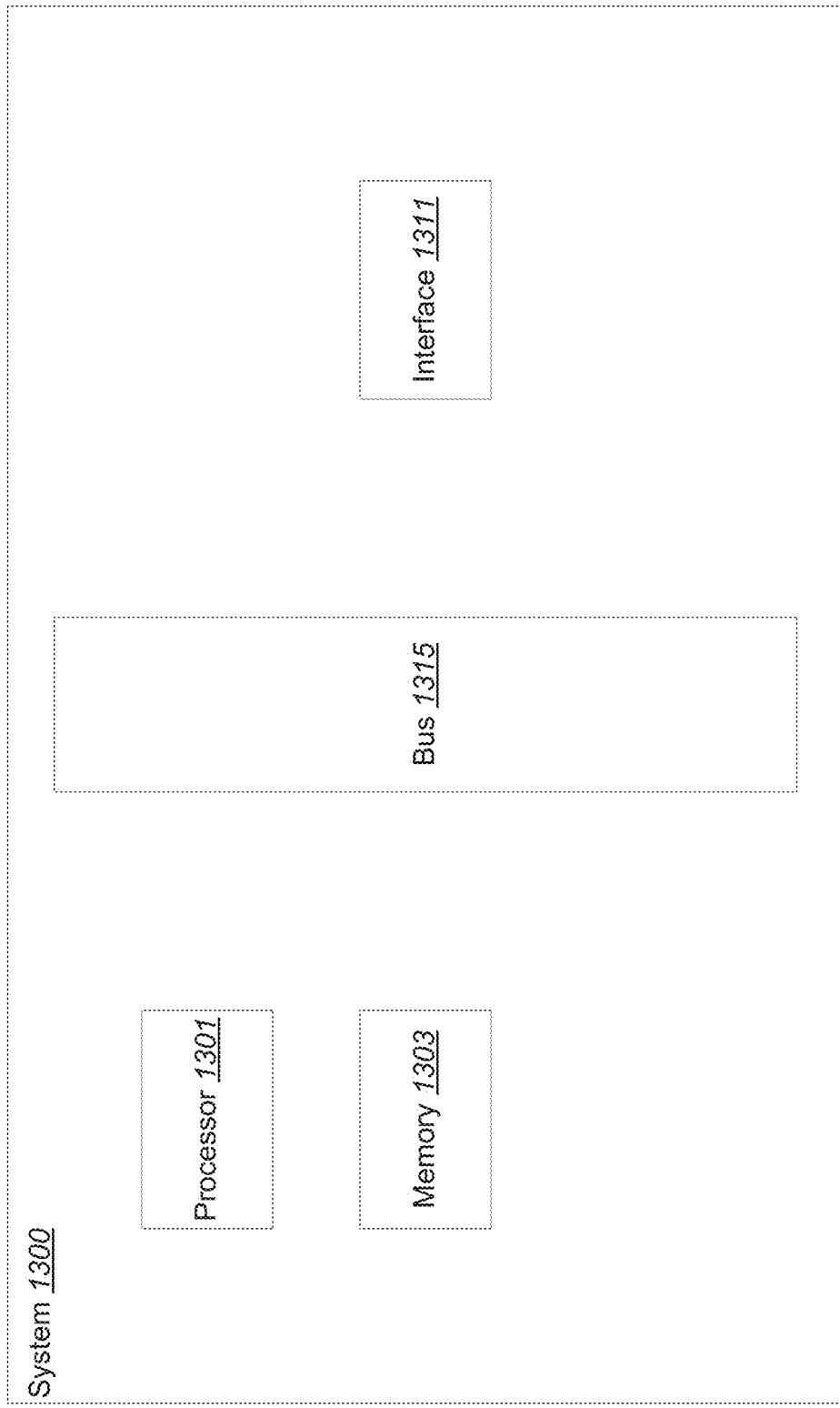

STABILIZING IMAGE SEQUENCES BASED ON CAMERA ROTATION AND FOCAL LENGTH PARAMETERS

CROSS-REFERENCE TO RELATED APPLICATIONS

This application is a continuation-in-part of U.S. patent application Ser. No. 14/530,669 by Holzer et al., filed on Oct. 31, 2014, titled "Analysis and Manipulation of Images and Video for Generation of Surround Views;" which application is incorporated by reference herein in its entirety and for all purposes.

TECHNICAL FIELD

The present disclosure relates generally to the capture and presentation of image sequences, and more specifically to stabilization of image sequences using camera rotation and focal length as parameters.

DESCRIPTION OF RELATED ART

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing combined images, such as a panorama, or a three-dimensional (3D) image or model requires combining data from multiple images and can require interpolation or extrapolation of data. Image stabilization is a family of techniques used to reduce blurring associated with the motion of a camera or other imaging device during exposure. Generally, it compensates for pan and tilt (angular movement, equivalent to yaw and pitch) of the imaging device, although electronic image stabilization can also be used to compensate for rotation. Most previously existing methods of image and/or video stabilization use affine, similarity transformation, or unconstrained full homography for image warping. However, this may result in optically incorrect image warping or distortion. These existing methods may additionally require a significant amount of data in addition to the available image data. For those approaches, the additional data needs to describe the scene structure in a dense way, such as provided by a dense depth map (where for every pixel a depth value is stored) or an optical flow map (which stores for every pixel the motion vector between the available images). This limits the efficiency of these methods in processing speed as well as transfer rates when sending it over a network. Accordingly, improved mechanisms for image stabilization are desirable.

SUMMARY

Provided are various mechanisms and processes relating to image sequence stabilization. In one aspect, which may include at least a portion of the subject matter of any of the preceding and/or following examples and aspects, the method comprises obtaining a sequence of images using a camera. The sequence of images is captured along a camera translation. Each image in the sequence of images contains at least a portion of overlapping subject matter, which may include an object. The method further comprises identifying a plurality of keypoints on a first image of the sequence of images. Identifying a plurality of keypoints may include using Harris-style keypoint detection. The method further comprises keeping track of each keypoint from the first image to a second image. Keeping track of each keypoint may include using KLT-style keypoint tracking.

The method further comprises calculating, using a predetermined algorithm, a camera rotation value and a focal length value from two randomly sampled keypoints on the first image and two corresponding keypoints on the second image. The method further comprises determining an optimal camera rotation and focal length pair corresponding to an optimal transformation for producing an image warp for image sequence stabilization. Determining the optimal camera rotation and focal length pair may include using random sample consensus on a plurality of transformations to determine the optimal transformation for image sequence stabilization. Determining the optimal camera rotation and focal length pair may include, for a particular transformation, determining a number of inlier keypoints and calculating an image intensity difference value between the transformation and the second image.

The method further comprises constructing the image warp for image sequence stabilization using the optimal camera and focal length pair. The image warp may be constructed as $KRK^{-1}$, where K is an intrinsic parameter given the optimal focal length, and R is a 3×3 rotation matrix.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features. In another aspect, which may include at least a portion of the subject matter of any of the preceding and/or following examples and aspects, a system for image sequence stabilization comprises a camera, a processor, and memory storing one or more programs configured for execution by the processor. The one or more programs comprise instructions for performing the actions of described methods and systems.

The one or more programs include instructions for obtaining a sequence of images using a camera. The sequence of images is captured along a camera translation. Each image in the sequence of images contains at least a portion of overlapping subject matter, which may include an object. The one or more programs include further instructions for identifying a plurality of keypoints on a first image of the sequence of images. The one or more programs include further instructions for keeping track of each keypoint from the first image to a second image.

The one or more programs include further instructions for calculating, using a predetermined algorithm, a camera rotation value and a focal length value from two randomly sampled keypoints on the first image and two corresponding keypoints on the second image. The one or more programs include further instructions for determining an optimal camera rotation and focal length pair corresponding to an optimal transformation for producing an image warp for image sequence stabilization. The one or more programs include further instructions for constructing the image warp for image sequence stabilization using the optimal camera and focal length pair.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIGS. 5A-5B illustrate examples of concave view and convex views, respectively, where both views use a back-camera capture style.

FIG. 13 illustrates a particular example of a computer system that can be used with various embodiments of the present disclosure.

DETAILED DESCRIPTION

Figure 1:
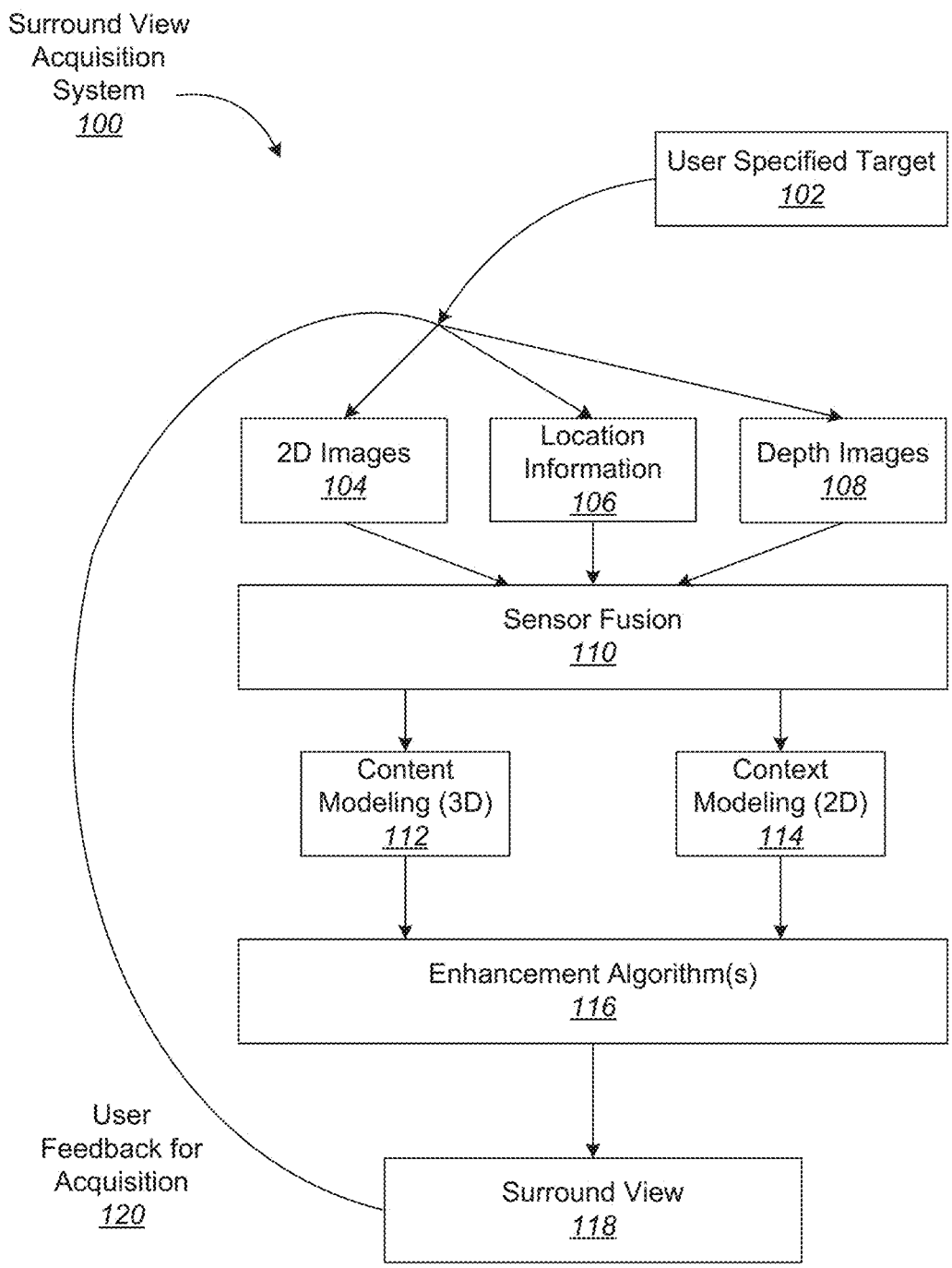
FIG. 1 illustrates an example of a surround view acquisition system.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

Various systems and methods for analyzing the spatial relationship between multiple images and video together with location information data, for the purpose of creating a single representation, a surround view, which eliminates redundancy in the data, and presents a user with an interactive and immersive active viewing experience, is described in U.S. patent application Ser. No. 14/530,669 by Holzer et al., filed on Oct. 31, 2014, titled "Analysis and Manipulation of Images and Video for Generation of Surround Views," which is incorporated by reference herein in its entirety and for all purposes. According to various embodiments described therein, a surround view provides a user with the ability to control the viewpoint of the visual information displayed on a screen.

Overview

According to various embodiments, a surround view is a multi-view interactive digital media representation. The data used to generate a surround view can come from a variety of sources. In particular, data such as, but not limited to, two-dimensional (2D) images can be used to generate a surround view. These 2D images can include color image data streams such as multiple image sequences, video data, etc., or multiple images in any of various formats for images, depending on the application. Another source of data that can be used to generate a surround view includes location information. This location information can be obtained from sources such as accelerometers, gyroscopes, magnetometers, GPS, WiFi, IMU-like systems (Inertial Measurement Unit systems), and the like. Yet another source of data that can be used to generate a surround view can include depth images. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together. In some embodiments, a surround view can be generated by a combination of data that includes both 2D images and location information, without any depth images provided. In other embodiments, depth images and location information can be used together. Various combinations of image data can be used with location information, depending on the application and available data.

In the present example embodiment, the data that has been fused together is then used for content modeling and context modeling. According to various examples, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. In various embodiments, the models provided by content modeling and context modeling can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target can be chosen. It should be noted, however, that a surround view can be generated without a user specified target in some applications.

In the present example embodiment, one or more enhancement algorithms can be applied. In particular example embodiments, various algorithms can be employed during capture of surround view data, regardless of the type of capture mode employed. These algorithms can be used to enhance the user experience. For instance, automatic frame selection, stabilization, view interpolation, image rotation, filters, and/or compression can be used during capture of surround view data. In some examples, these enhancement algorithms can be applied to image data after acquisition of the data. In other examples, these enhancement algorithms can be applied to image data during capture of surround view data.

According to various examples, frame stabilization may be used to improve the viewing experience. In particular, to correct for inadvertently and/or unwanted movement during image capture, which may cause distracting vibrations when viewing a video and/or surround view, methods of image stabilization using camera rotation and focal length as parameters can create steady transitions between captured frames. As described herein, using focal length and camera rotation as stabilization parameters has a clear physical mean.

This provides improvements compared to existing methods of stabilization using affine, similarity transformation, and/or unconstrained full homography for image warping, which can result in optically incorrect image warp and distortion. In other words, given the captured video sequence, each image represents a three-dimensional camera location of a camera in a three-dimensional world, the video stabilization problem is modeled as how to rotate and zoom these set of cameras in three-dimensional space in order to produce a spatially smooth video footage from the original captured sequence. Because the image warp is mapped from physically meaningful parameters (focal length and camera rotation), the warped image will follow optical rules of physics, and the stabilized video output will be optically correct and free from unsound distortion. Moreover, unlike existing methods of image stabilization, such image stabilization by methods described herein may be implemented to stabilize image sequences captured during concave camera translation, such as for a concave surround view, as well as for convex panoramic views. Additionally, unlike existing methods of image stabilization, such image stabilization, as described herein, may also stabilize image sequences corresponding to movement in 3D space. Such image stabilization using focal length and rotation may be implemented to create stereoscopic pairs of image frames, as such as the systems and methods described in the U.S. patent application Ser. No. 15/408,211 titled GENERATING STEREOSCOPIC PAIRS OF IMAGES FROM A SINGLE LENS CAMERA by Holzer et al., filed on Jan. 17, 2017, which application is incorporated by reference herein in its entirety and for all purposes.

According to various examples, view interpolation can also be used to improve the viewing experience. In particular, to avoid sudden "jumps" between stabilized frames, synthetic, intermediate views can be rendered on the fly. Such artificially rendered frames may be generated in order to provide a smooth viewing experience for a user interacting with a surround view. This can be informed by content-weighted keypoint tracks and IMU information, as well as by denser pixel-to-pixel matches. If depth information is available, fewer artifacts resulting from mismatched pixels may occur, thereby simplifying the process. View interpolation can be applied during capture of a surround view in some embodiments. In other embodiments, view interpolation can be applied during surround view generation.

In various examples, interpolation between frames is performed along a path between the frames. In some instances, this path can follow a non-linear trajectory. In addition, various described extrapolation methods allow the artificially rendered frame to represent a view from a location that is not on the trajectory of the recording camera or in between two sampled frames. By providing interpolation and extrapolation methods for paths between or beyond the originally provided frames, various artificially rendered views can be provided for a surround view. These artificially rendered frames serve to close the gap between two sampled frames that would otherwise appear to have a "jump" between them. Accordingly, by generating these artificially rendered frames, smooth navigation within the surround view becomes possible.

A surround view may be generated after any enhancement algorithms are applied. The surround view can provide a multi-view interactive digital media representation. In various examples, the surround view can include a three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

Example Embodiments

According to various embodiments of the present disclosure, a surround view is a multi-view interactive digital media representation. With reference to FIG. 1, shown is one example of a surround view acquisition system 100. In the present example embodiment, the surround view acquisition system 100 is depicted in a flow sequence that can be used to generate a surround view. According to various embodiments, the data used to generate a surround view can come from a variety of sources. In particular, data such as, but not limited to two-dimensional (2D) images 104 can be used to generate a surround view. These 2D images can include color image data streams such as multiple image sequences, video data, etc., or multiple images in any of various formats for images, depending on the application. Another source of data that can be used to generate a surround view includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate a surround view can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a surround view can be generated a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a surround view can be generated without a user specified target in some applications.

In the present example embodiment, one or more enhancement algorithms can be applied at enhancement algorithm(s) block 116. In particular example embodiments, various algorithms can be employed during capture of surround view data, regardless of the type of capture mode employed. These algorithms can be used to enhance the user experience. For instance, automatic frame selection, stabilization, view interpolation, image rotation, infinite smoothing, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, keyframes in a surround view can be stabilized for to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples. Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic keypoints.

As described further herein, focal length and camera rotation may be utilized as stabilization parameters. By randomly selecting two keypoints in a first frame and corresponding keypoints a second frame, a focal length and camera rotation may be determined, and provide a calculated transformation between the two frames. The transformation may then be applied to the first frame and an image intensity difference can be calculated between the transformed first frame and the second frame. A RANSAC (random sample consensus) algorithm may then be implemented to calculate multiple transformation based on randomly selected pairs of keypoints in each frame, and determine the transformation resulting in the smallest image intensity difference. This process can be used to determine the best transformation between each frame to compose a smooth trajectory and offset each frame to fit the trajectory.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, view interpolation may be implemented as infinite smoothing, which may also be used to improve the viewing experience by creating a smoother transition between displayed frames, which may be actual or interpolated, as described above. Infinite smoothing may include determining a predetermined amount of possible transformations between frames. A Harris corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. A RANSAC (random sample consensus) algorithm may then be implemented to determine a number of the most common occurring transformation candidates possible based on all possible transformations of the keypoints between frames. For example, a smooth flow space of eight possible transformations and/or motions for various pixels between frames may be discretized. Different transformations may be assigned to different pixels in a frame. Such keypoint detection, keypoint tracking, and RANSAC algorithms may be run offline. In some embodiments, infinite smoothing algorithms may be run in real time on the fly. For example, as the user navigate to a particular translation position, and if that translation position does not already correspond to an existing and/or captured image frame, the system may generate an appropriate artificial image frame corresponding to the particular translation position using the optimal transformation chosen from the possible transformation candidates.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 116. In particular, compression can be used to enhance user-experience by reducing data upload and download costs. Because surround views use spatial information, far less data can be sent for a surround view than a typical video, while maintaining desired qualities of the surround view. Specifically, the IMU, keypoint tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 118 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

According to various example embodiments, once a surround view 118 is generated, user feedback for acquisition 120 of additional image data can be provided. In particular, if a surround view is determined to need additional views to provide a more accurate model of the content or context, a user may be prompted to provide additional views. Once these additional views are received by the surround view acquisition system 100, these additional views can be processed by the system 100 and incorporated into the surround view.

Figure 2:
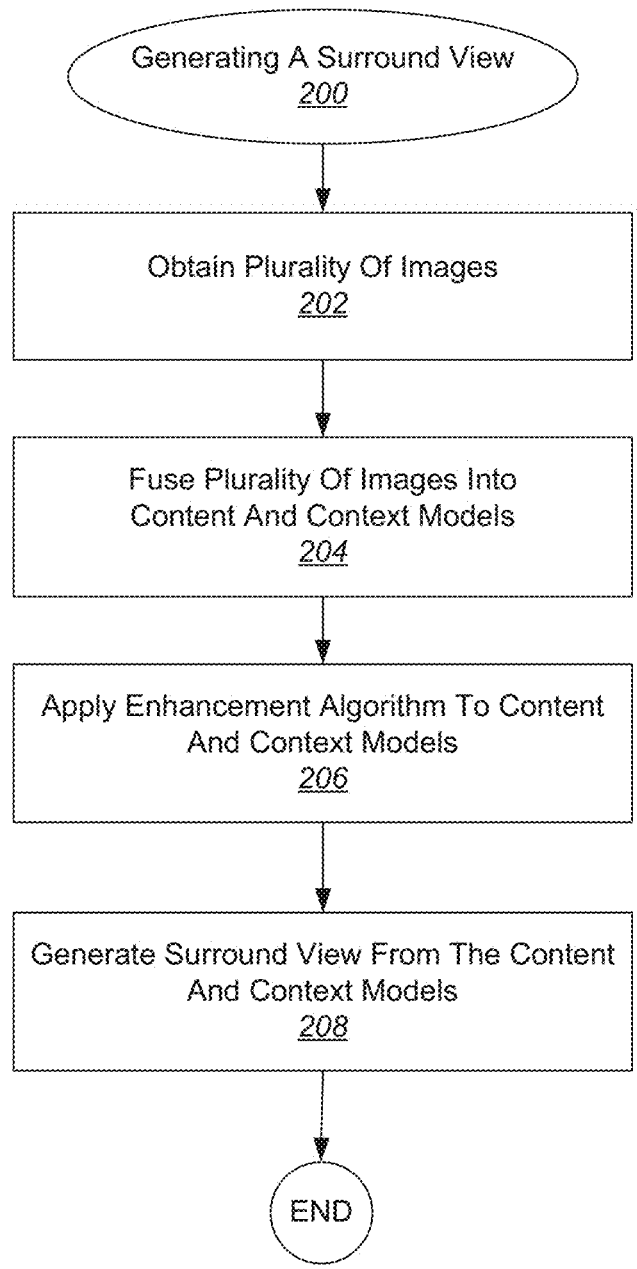
FIG. 2 illustrates an example of a process flow for generating a surround view.

With reference to FIG. 2, shown is an example of a process flow diagram for generating a surround view 200. In the present example, a plurality of images is obtained at 202. According to various embodiments, the plurality of images may be various types of images obtained by various types of cameras. For example, a camera may be a digital camera in a continuous shooting mode (or burst mode) configured to capture a number of frames in a certain amount of time, such as five frames per second. In other embodiments, the camera may be a camera on a smartphone. In some embodiments, the camera may be configured to capture the plurality of images as a continuous video.

According to various embodiments, the plurality of images can include two-dimensional (2D) images or data streams. These 2D images can include location information that can be used to generate a surround view. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, image rotation, infinite smoothing, filters, and/or compression can be used. In some examples, these enhancement algorithms can be applied to image data during capture of the images. In other examples, these enhancement algorithms can be applied to image data after acquisition of the data.

In the present embodiment, a surround view is generated from the content and context models at 208. The surround view can provide a multi-view interactive digital media representation. In various examples, the surround view can include a three-dimensional model of the content and a two-dimensional model of the context. According to various embodiments, depending on the mode of capture and the viewpoints of the images, the surround view model can include certain characteristics. For instance, some examples of different styles of surround views include a locally concave surround view, a locally convex surround view, and a locally flat surround view. However, it should be noted that surround views can include combinations of views and characteristics, depending on the application. In some embodiments, the surround view model is not an actual three-dimensional model that is rendered, but a three-dimensional view experienced as a three-dimensional model by the user. For example, the surround view provides a three-dimensional view of the content without rendering and/or storing an actual three-dimensional model. In other words, there is no polygon generation or texture mapping over a three-dimensional mesh and/or polygon model. However, the user still perceives the content and/or context as an actual three-dimensional model. The three-dimensional effect provided by the surround view is generated simply through stitching of actual two-dimensional images and/or portions thereof. As used herein, the term "three-dimensional model" is used interchangeably with this type of three-dimensional view.

Figure 3:
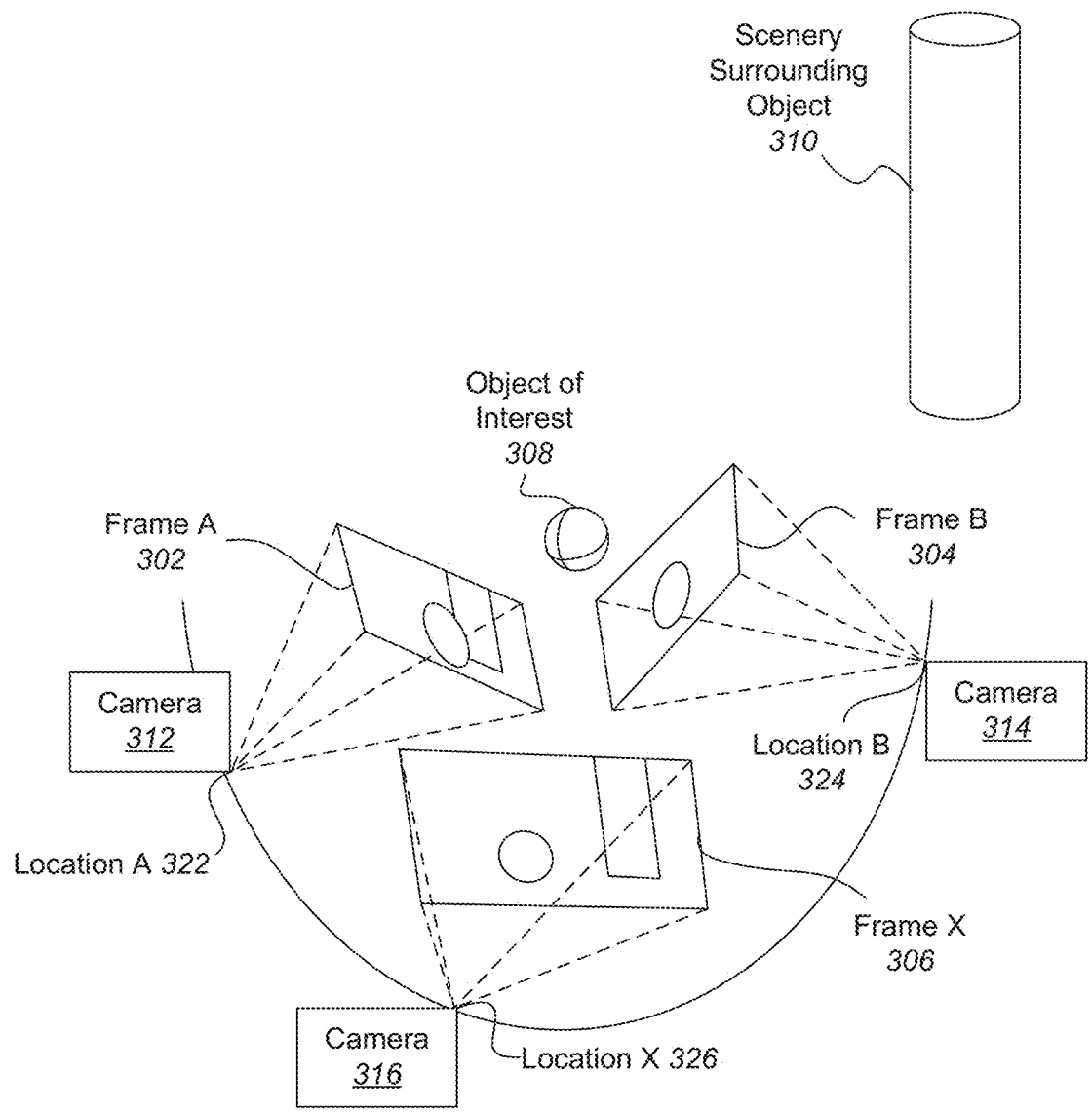
FIG. 3 illustrates one example of multiple camera views that can be fused into a three-dimensional (3D) model to create an immersive experience.

With reference to FIG. 3, shown is one example of multiple camera frames that can be fused together into a three-dimensional (3D) model to create an immersive experience. According to various embodiments, multiple images can be captured from various viewpoints and fused together to provide a surround view. In the present example embodiment, three cameras 312, 314, and 316 are positioned at location A 322, location B 324, and location X 326, respectively, in proximity to an object of interest 308. Scenery can surround the object of interest 308 such as object 310. Frame A 302, frame B 304, and frame X 306 from their respective cameras 312, 314, and 316 include overlapping subject matter. Specifically, each frame 302, 304, and 306 includes the object of interest 308 and varying degrees of visibility of the scenery surrounding the object 310. For instance, frame A 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various frames, frame A 302, frame B 304, and frame X 316, along with their associated locations, location A 322, location B 324, and location X 326, respectively, provide a rich source of information about object of interest 308 and the surrounding context that can be used to produce a surround view. For instance, when analyzed together, the various frames 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a surround view.

In some embodiments, Frame X 306 may be an artificially rendered image that is generated for a viewpoint at Location X 326 on a trajectory between Location A 322 and Location B 324. In such example, a single transform for viewpoint interpolation is used along the trajectory between two frames, Frame A 302 and Frame B 304. As previously described, Frame A 302 represents an image captured of objects 108 and 110 by a camera 112 located at Location A 122. Frame B 104 represents an image captured of object 108 by a camera 114 located at Location B 124. In the present example, the transformation (T_AB) is estimated between the two frames, where T_AB maps a pixel from frame A to frame B. This transformation is performed using methods such as homography, affine, similarity, translation, rotation, or scale.

In the example above, an artificially rendered image at Location X 126, which can also be denoted as a viewpoint position at x \in [0, 1] on the trajectory between frame A and B, where frame A is located at 0 and frame B at 1, is then generated by interpolating the transformation, gathering image information from Frames A and B, and combining the image information. In the present example, the transformation is interpolated (T_AX and T_XB). One way to interpolate this transformation is to parameterize the transformation T_AB and linearly interpolate those parameters. However, this interpolation is not limited to linear interpolations and other methods can be used within the scope of this disclosure. Next, image information is gathered from both Frames A and B by transferring image information from Frame A 102 to Frame X 106 based on T_AX and by transferring image information from Frame B 104 to Frame X 106 based on T_XB. Finally, the image information gathered from both Frames A and B is combined to generate an artificially rendered image at Location X 126. Interpolation to render artificial frames is further described below with references to FIGS. 13-20.

Figure 4:
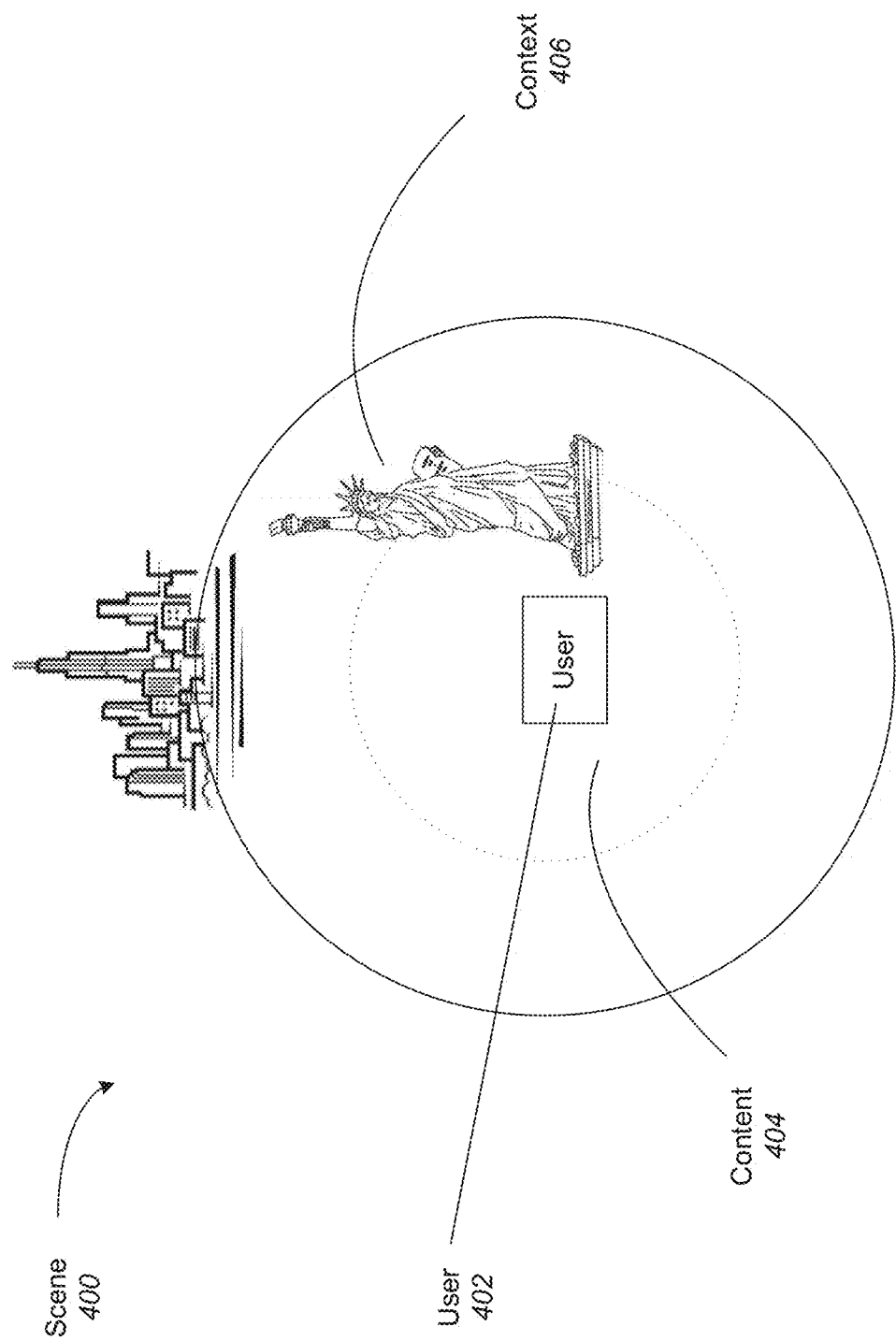
FIG. 4 illustrates one example of separation of content and context in a surround view.

FIG. 4 illustrates one example of separation of content and context in a surround view. According to various embodiments of the present disclosure, a surround view is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate a surround view.

According to various embodiments of the present disclosure, the digital visual data included in a surround view can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a surround view may represent the content 404 as three-dimensional data, and the context 406 as a two-dimensional panoramic background. In other examples, a surround view may represent both the content 404 and context 406 as two-dimensional panoramic scenes. In yet other examples, content 404 and context 406 may include three-dimensional components or aspects. In particular embodiments, the way that the surround view depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the surround view produced may have some characteristics that are similar to other types of digital media such as panoramas. However, according to various embodiments, surround views include additional features that distinguish them from these existing types of digital media. For instance, a surround view can represent moving data. Additionally, a surround view is not limited to a specific cylindrical, spherical or translational movement. Various motions can be used to capture image data with a camera or other capture device. Furthermore, unlike a stitched panorama, a surround view can display different sides of the same object.

FIGS. 5A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a surround view.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A-6E illustrate examples of various capture modes for surround views. Although various motions can be used to capture a surround view and are not constrained to any particular type of motion, three general types of motion can be used to capture particular features or views described in conjunction surround views. These three types of motion, respectively, can yield a locally concave surround view, a locally convex surround view, and a locally flat surround view. In some examples, a surround view can include various types of motions within the same surround view. As described with reference to FIGS. 6A-6E, the type of surround view (for example, concave or convex) is described with reference to the direction of the camera view.

Figure 6A:
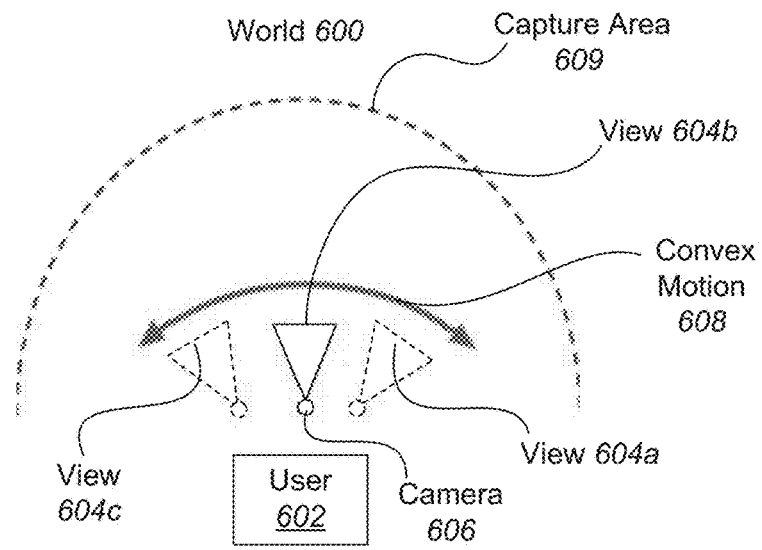
FIGS. 6A-6E illustrate examples of various capture modes for surround views.

With reference to FIG. 6A, shown is an example of a back-facing, convex surround view being captured. According to various embodiments, a locally convex surround view is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609, which may include an object of interest 601.

Figure 6B:
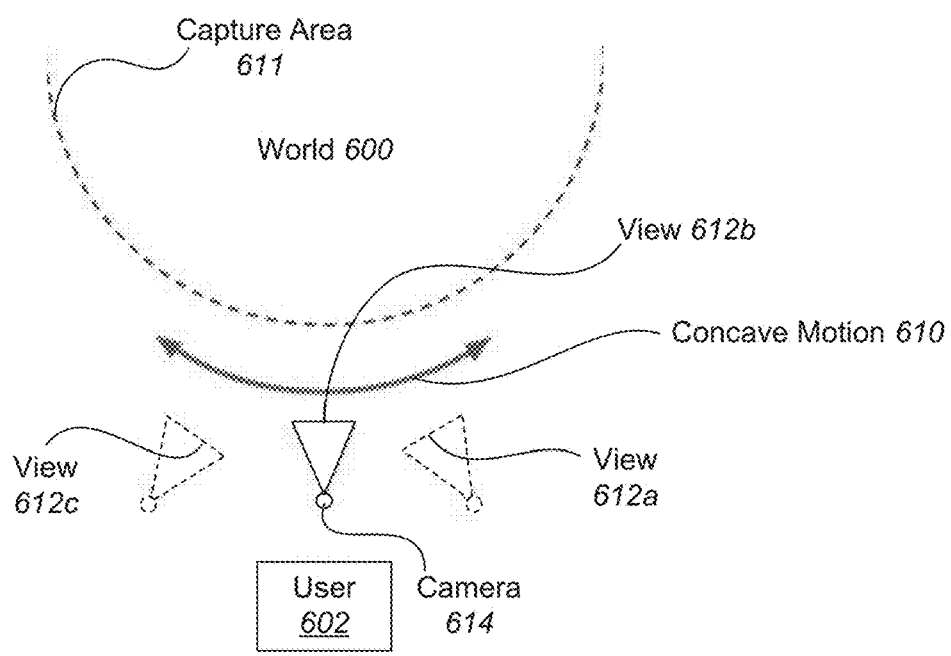

With reference to FIG. 6B, shown is an example of a back-facing, concave surround view being captured. According to various embodiments, a locally concave surround view is one in which viewing angles converge toward a single object of interest. In some examples, a locally concave surround view can provide the experience of orbiting about a point, such that a viewer can see multiple sides of the same object. This object, which may be an "object of interest," can be segmented from the surround view to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a concave motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
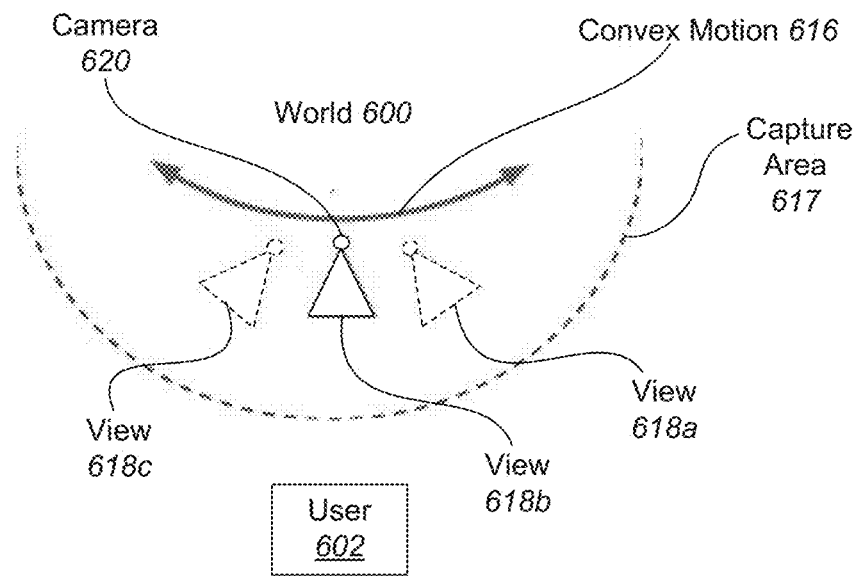

With reference to FIG. 6C, shown is an example of a front-facing, convex surround view being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a convex motion 616 such that the views 618a, 618b, and 618c diverge from each other in an angular sense. The capture area 617 follows a convex shape that includes the user at a perimeter.

Figure 6D:
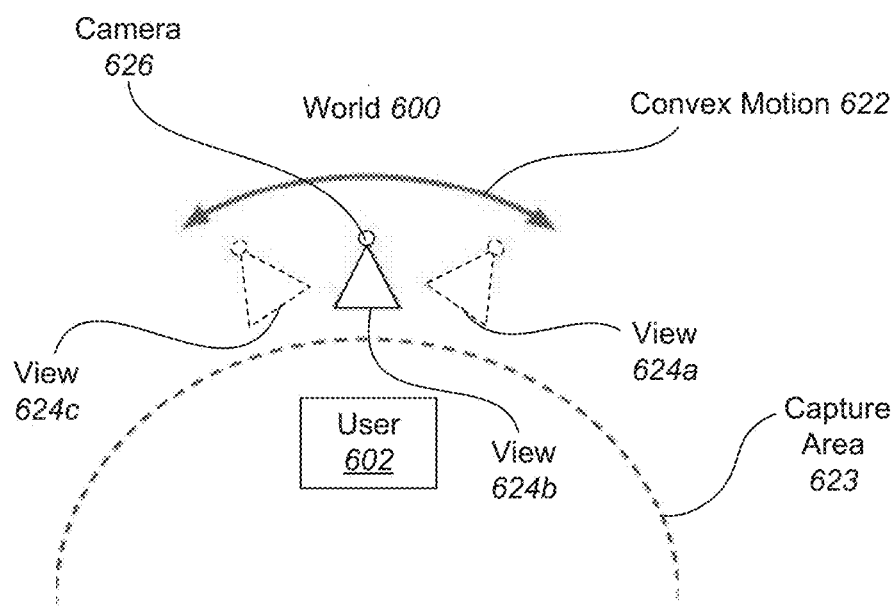

With reference to FIG. 6D, shown is an example of a front-facing, concave surround view being captured. In the present example embodiment, camera 626 is facing user 602. The camera follows a concave motion 622 such that the views 624a, 624b, and 624c converge towards the user 602. The capture area 623 follows a concave shape that surrounds the user 602.

Figure 6E:
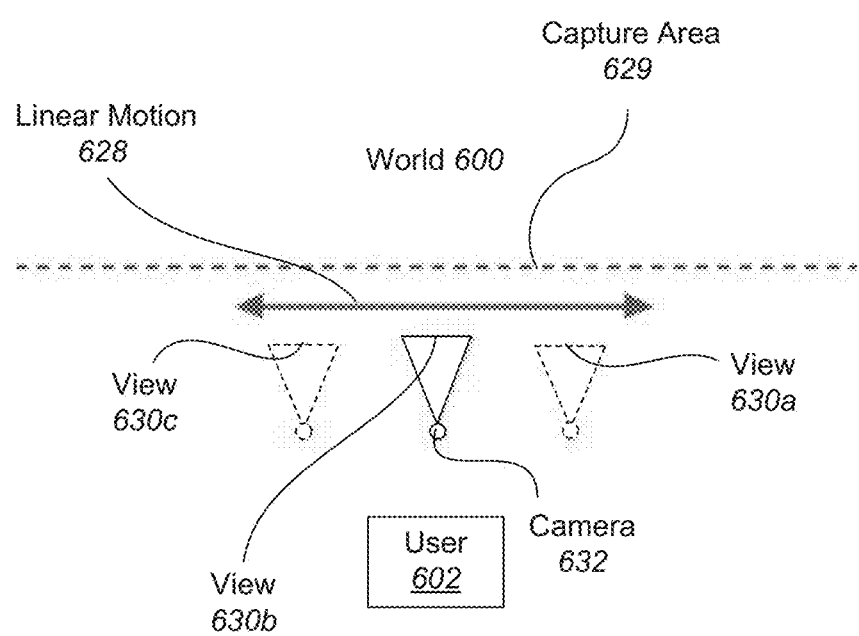

With reference to FIG. 6E, shown is an example of a back-facing, flat view being captured. In particular example embodiments, a locally flat surround view is one in which the rotation of the camera is small compared to its translation. In a locally flat surround view, the viewing angles remain roughly parallel, and the parallax effect dominates.

In this type of surround view, there can also be an "object of interest", but its position does not remain fixed in the different views. Previous technologies also fail to recognize this type of viewing angle in the media-sharing landscape.

In the present example embodiment, camera 632 is facing away from user 602, and towards world 600. The camera follows a generally linear motion 628 such that the capture area 629 generally follows a line. The views 630a, 630b, and 630c have generally parallel lines of sight. An object viewed in multiple views can appear to have different or shifted background scenery in each view. In addition, a slightly different side of the object may be visible in different views. Using the parallax effect, information about the position and characteristics of the object can be generated in a surround view that provides more information than any one static image.

As described above, various modes can be used to capture images for a surround view. These modes, including locally concave, locally convex, and locally linear motions, can be used during capture of separate images or during continuous recording of a scene. Such recording can capture a series of images during a single session.

According to various embodiments of the present disclosure, a surround view can be generated from data acquired in numerous ways. For example, data may be acquired by moving a camera through space as described with reference to FIG. 7 of U.S. patent application Ser. No. 14/530,669. In particular, a user may tap a record button on a capture device to begin recording. As movement of the capture device follows a generally leftward direction, an object may move in a generally rightward motion across the screen. As the capture device moves leftward, the object appears to move rightward between subsequent views. In some examples, when the user is finished recording, the record button can be tapped again to end recording. In other examples, the user can tap and hold the record button during recording, and release to stop recording. In the present embodiment, the recording captures a series of images that can be used to generate a surround view.

Figure 7:
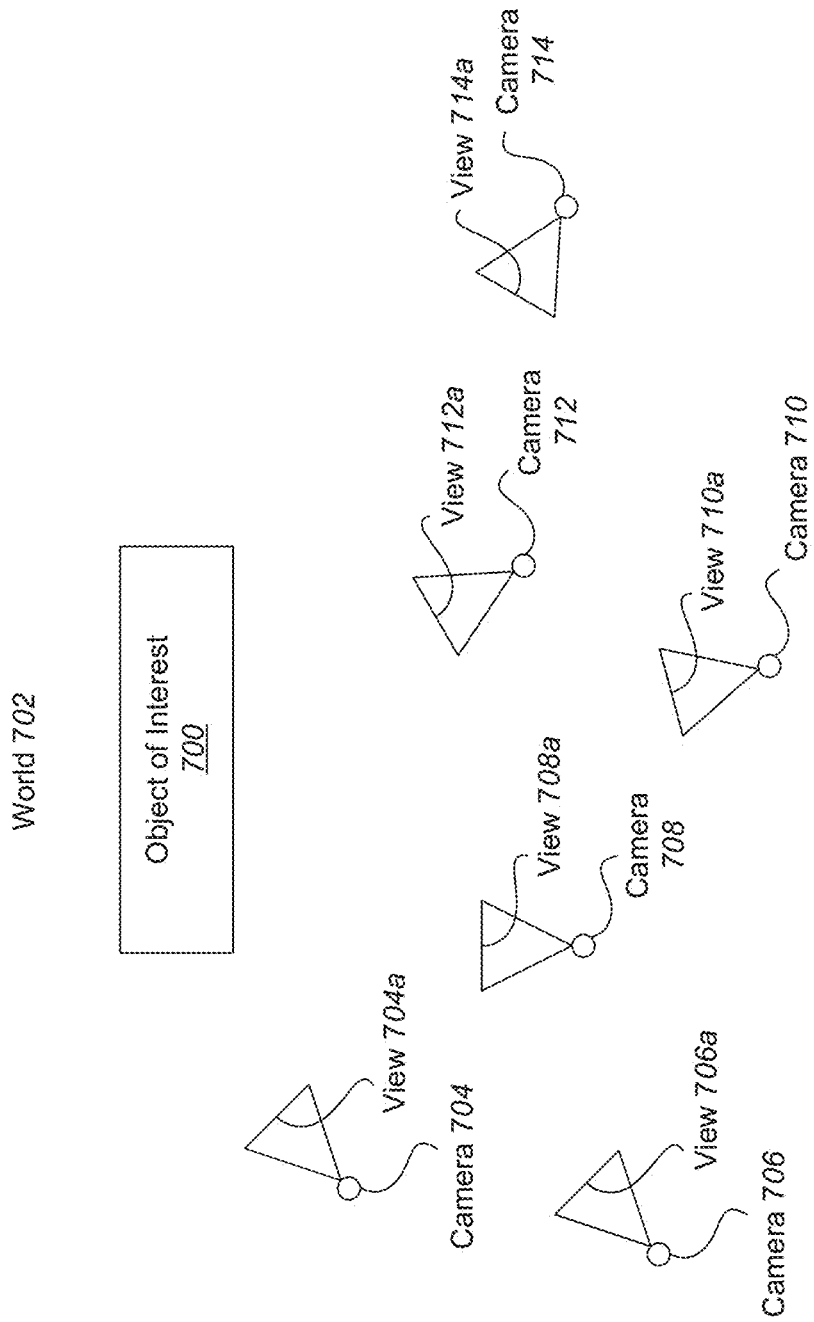
FIG. 7 illustrates one example of a space-time surround view being simultaneously recorded by independent observers.

According to various embodiments, a series of images used to generate a surround view can be captured by a user recording a scene, object of interest, etc. Additionally, in some examples, multiple users can contribute to acquiring a series of images used to generate a surround view. With reference to FIG. 7, shown is one example of a space-time surround view being simultaneously recorded by independent observers.

In the present example embodiment, cameras 704, 706, 708, 710, 712, and 714 are positioned at different locations. In some examples, these cameras 704, 706, 708, 710, 712, and 714 can be associated with independent observers. For instance, the independent observers could be audience members at a concert, show, event, etc. In other examples, cameras 704, 706, 708, 710, 712, and 714 could be placed on tripods, stands, etc. In the present embodiment, the cameras 704, 706, 708, 710, 712, and 714 are used to capture views 704a, 706a, 708a, 710a, 712a, and 714a, respectively, of an object of interest 700, with world 702 providing the background scenery. The images captured by cameras 704, 706, 708, 710, 712, and 714 can be aggregated and used together in a single surround view in some examples. Each of the cameras 704, 706, 708, 710, 712, and 714 provides a different vantage point relative to the object of interest 700, so aggregating the images from these different locations provides information about different viewing angles of the object of interest 700. In addition, cameras 704, 706, 708, 710, 712, and 714 can provide a series of images from their respective locations over a span of time, such that the surround view generated from these series of images can include temporal information and can also indicate movement over time.

As described above with regard to various embodiments, surround views can be associated with a variety of capture modes. In addition, a surround view can include different capture modes or different capture motions in the same surround view. Accordingly, surround views can be separated into smaller parts in some examples, such as described with reference to FIG. 10 of U.S. patent application Ser. No. 14/530,669. For example, a complex surround-view may be separated into smaller, linear parts. In some embodiments, a complex surround view may include a capture area that follows a sweeping L motion, which includes two separate linear motions of the camera. The surround views associated with these separate linear motions can be broken down into two separate surround views. It should be noted that although the linear motions of the complex surround view can be captured sequentially and continuously in some embodiments, such linear motions can also be captured in separate sessions in other embodiments.

In some embodiments, the two linear surround views can be processed independently, and joined with a transition to provide a continuous experience for the user. Breaking down motion into smaller linear components in this manner can provide various advantages. For instance, breaking down these smaller linear components into discrete, loadable parts can aid in compression of the data for bandwidth purposes. Similarly, non-linear surround views can also be separated into discrete components. In some examples, surround views can be broken down based on local capture motion. For example, a complex motion may be broken down into a locally convex portion and a linear portion. In another example, a complex motion can be broken down into separate locally convex portions. It should be recognized that any number of motions can be included in a complex surround view, and that such complex surround view can be broken down into any number of separate portions, depending on the application.

Figure 8:
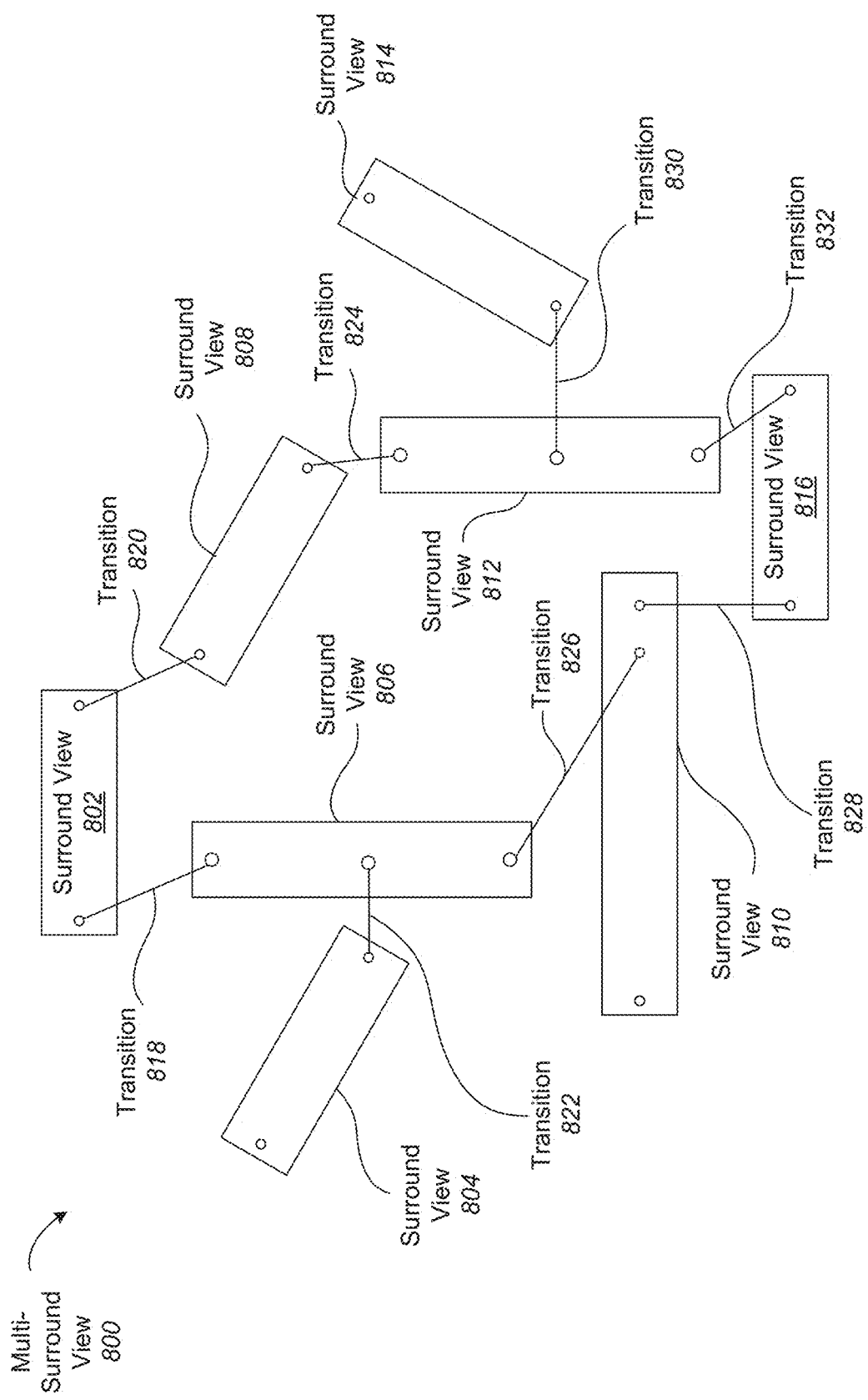
FIG. 8 illustrates one example of a combination of multiple surround views into a multi-surround view.

Although in some applications, it is desirable to separate complex surround views, in other applications it is desirable to combine multiple surround views. With reference to FIG. 8, shown is one example of a graph that includes multiple surround views combined into a multi-surround view 800. In this example, the rectangles represent various surround views 802, 804, 806, 808, 810, 812, 814, and 816, and the length of each rectangle indicates the dominant motion of each surround view. Lines between the surround views indicate possible transitions 818, 820, 822, 824, 826, 828, 830, and 832 between them.

In some examples, a surround view can provide a way to partition a scene both spatially and temporally in a very efficient manner. For very large scale scenes, multi-surround view 800 data can be used. In particular, a multi-surround view 800 can include a collection of surround views that are connected together in a spatial graph. The individual surround views can be collected by a single source, such as a single user, or by multiple sources, such as multiple users. In addition, the individual surround views can be captured in sequence, in parallel, or totally uncorrelated at different times. However, in order to connect the individual surround views, there must be some overlap of content, context, or location, or of a combination of these features. Accordingly, any two surround views would need to have some overlap in content, context, and/or location to provide a portion of a multi-surround view 800. Individual surround views can be linked to one another through this overlap and stitched together to form a multi-surround view 800. According to various examples, any combination of capture devices with either front, back, or front and back cameras can be used.

In some embodiments, multi-surround views 800 can be generalized to more fully capture entire environments. Much like "photo tours" collect photographs into a graph of discrete, spatially-neighboring components, multiple surround views can be combined into an entire scene graph. In some examples, this can be achieved using information obtained from but not limited to: image matching/tracking, depth matching/tracking, IMU, user input, and/or GPS. Within such a graph or multi-surround view, a user can switch between different surround views either at the end points of the recorded motion or wherever there is an overlap with other surround views in the graph. One advantage of multi-surround views over "photo tours" is that a user can navigate the surround views as desired and much more visual information can be stored in surround views. In contrast, traditional "photo tours" typically have limited views that can be shown to the viewer either automatically or by allowing the user to pan through a panorama with a computer mouse or keystrokes.

According to various embodiments, a surround view is generated from a set of images. These images can be captured by a user intending to produce a surround view or retrieved from storage, depending on the application. Because a surround view is not limited or restricted with respect to a certain amount of visibility, it can provide significantly more visual information about different views of an object or scene. More specifically, although a single viewpoint may be ambiguous to adequately describe a three-dimensional object, multiple views of the object can provide more specific and detailed information. These multiple views can provide enough information to allow a visual search query to yield more accurate search results. Because a surround view provides views from many sides of an object, distinctive views that are appropriate for search can be selected from the surround view or requested from a user if a distinctive view is not available. For instance, if the data captured or otherwise provided is not sufficient to allow recognition or generation of the object or scene of interest with a sufficiently high certainty, a capturing system can guide a user to continue moving the capturing device or provide additional image data. In particular embodiments, if a surround view is determined to need additional views to produce a more accurate model, a user may be prompted to provide additional images.

Once a surround view is generated, it can be used in various applications, in particular embodiments. One application for a surround view includes allowing a user to navigate a surround view or otherwise interact with it. According to various embodiments, a surround view is designed to simulate the feeling of being physically present in a scene as the user interacts with the surround view. This experience depends not only on the viewing angle of the camera, but on the type of surround view that is being viewed. Although a surround view does not need to have a specific fixed geometry overall, different types of geometries can be represented over a local segment of a surround view such as a concave, convex, and flat surround view, in particular embodiments.

In particular example embodiments, the mode of navigation is informed by the type of geometry represented in a surround view. For instance, with concave surround views, the act of rotating a device (such as a smartphone, etc.) can mimic that of rotating a stationary observer who is looking out at a surrounding scene. In some applications, swiping the screen in one direction can cause the view to rotate in the opposite direction. This effect is akin to having a user stand inside a hollow cylinder and pushing its walls to rotate around the user. In other examples with convex surround views, rotating the device can cause the view to orbit in the direction it is leaning into, such that the object of interest remains centered. In some applications, swiping the screen in one direction causes the viewing angle to rotate in the same direction: this creates the sensation of rotating the object of interest about its axis or having the user rotate around the object. In some examples with flat views, rotating or moving a device can cause the view to translate in the direction of the device's movement. In addition, swiping the screen in one direction can cause the view to translate in the opposite direction, as if pushing foreground objects to the side.

In some examples, a user may be able to navigate a multi-surround view or a graph of surround views in which individual surround views can be loaded piece by piece and further surround views may be loaded when necessary (e.g. when they are adjacent to/overlap the current surround view and/or the user navigates towards them). If the user reaches a point in a surround view where two or more surround views overlap, the user can select which of those overlapping surround views to follow. In some instances, the selection of which surround view to follow can be based on the direction the user swipes or moves the device.

Figure 9:
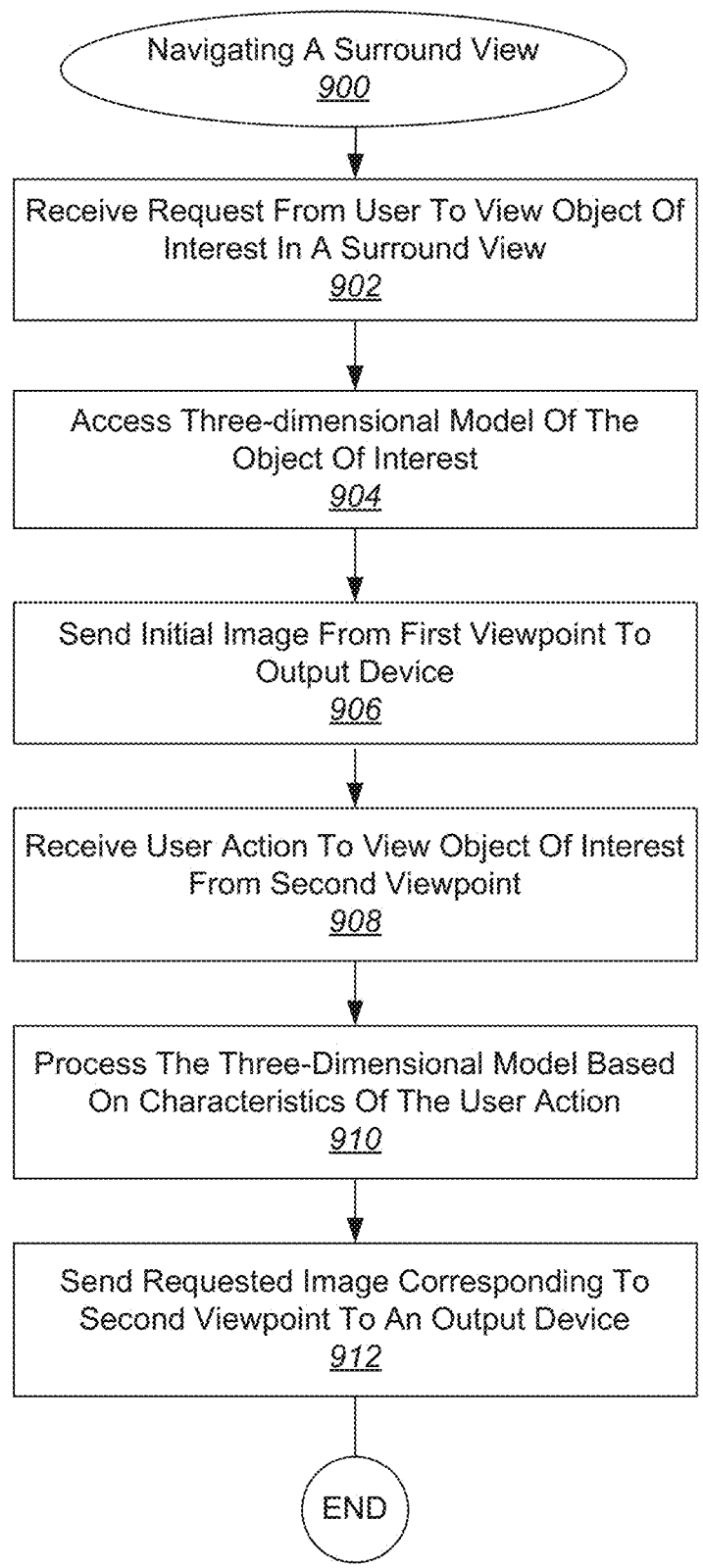
FIG. 9 illustrates one example of a process for navigating a surround view.

With reference to FIG. 9, shown is one example of a process for navigating a surround view 900. In the present example, a request is received from a user to view an object of interest in a surround view at 902. According to various embodiments, the request can also be a generic request to view a surround view without a particular object of interest, such as when viewing a landscape or panoramic view. Next, a three-dimensional model of the object is accessed at 904. This three-dimensional model can include all or a portion of a stored surround view. For instance, the three-dimensional model can be a segmented content view in some applications. An initial image is then sent from a first viewpoint to an output device at 906. This first viewpoint serves as a starting point for viewing the surround view on the output device.

In the present embodiment, a user action is then received to view the object of interest from a second viewpoint at 908. This user action can include moving (e.g. tilting, translating, rotating, etc.) an input device, swiping the screen, etc., depending on the application. For instance, the user action can correspond to motion associated with a locally concave surround view, a locally convex surround view, or a locally flat surround view, etc. Based on the characteristics of the user action, the three-dimensional model is processed at 910. For instance, movement of the input device can be detected and a corresponding viewpoint of the object of interest can be found. Depending on the application, the input device and output device can both be included in a mobile device, etc. In some examples, the requested image corresponds to an image captured prior to generation of the surround view. In other examples the requested image is generated based on the three-dimensional model (e.g. by interpolation, etc.). An image from this viewpoint can be sent to the output device at 912. In some embodiments, the selected image can be provided to the output device along with a degree of certainty as to the accuracy of the selected image. For instance, when interpolation algorithms are used to generate an image from a particular viewpoint, the degree of certainty can vary and may be provided to a user in some applications.

In other examples, a message can be provided to the output device indicating if there is insufficient information in the surround view to provide the requested images.

In some embodiments, intermediate images can be sent between the initial image at 906 and the requested image at 912. In particular, these intermediate images can correspond to viewpoints located between a first viewpoint associated with the initial image and a second viewpoint associated with the requested image. Furthermore, these intermediate images can be selected based on the characteristics of the user action. For instance, the intermediate images can follow the path of movement of the input device associated with the user action, such that the intermediate images provide a visual navigation of the object of interest.

Image stabilization may be performed on a sequence of images captured to reduce blurring associated with the motion of a camera or other imaging device during exposure. Image stabilization may require first determining the optimal transformation occurring between two consecutive frames. Most previously existing methods of image and/or video stabilization use affine, similarity transformation, or unconstrained full homography as parameters for image warping. However, this may result in optically incorrect image warping or distortion.

Figure 10:
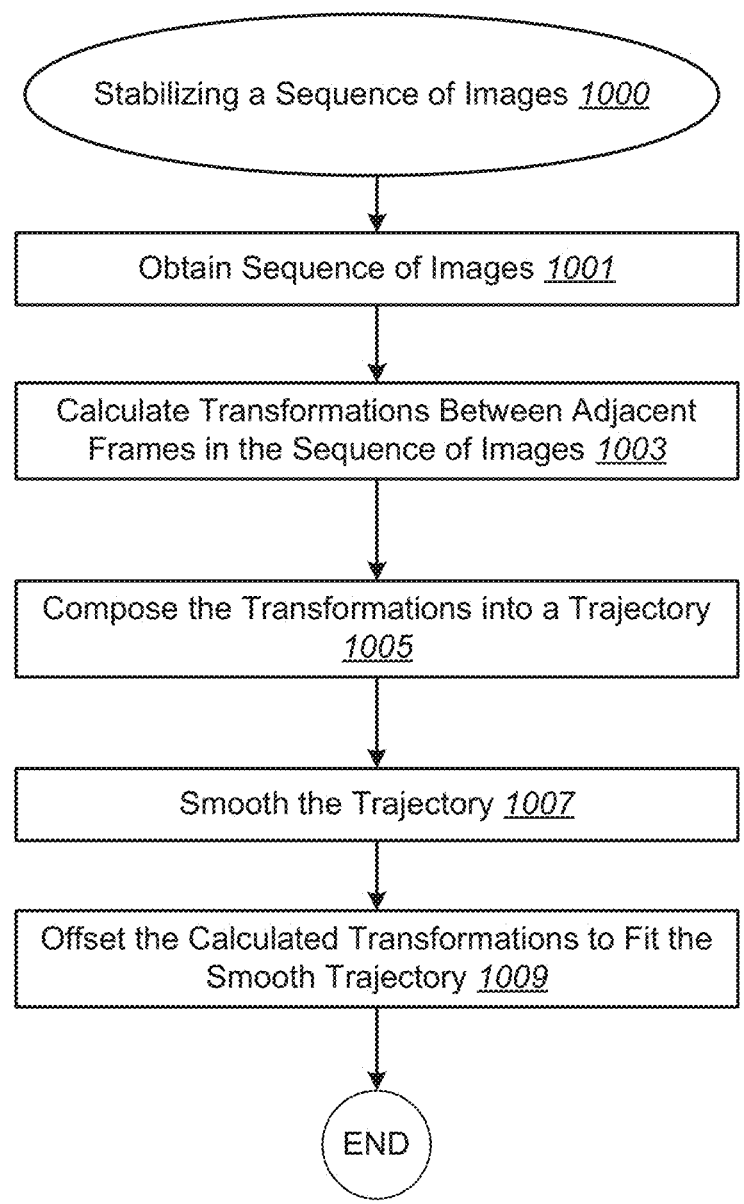
FIG. 10 illustrates an example method for stabilizing a sequence of images, in accordance with one or more embodiments.

With reference to FIG. 10, shown is an example method 1000 for stabilizing a sequence of images, in accordance with one or more embodiments. Method 1000 may be an example of an image stabilization pipeline. At step 1001, a sequence of images is obtained. In some embodiments, the sequence of images may be multiple snapshots and/or video captured by a camera as previously described with reference to FIGS. 1-7. In some embodiments, the camera may comprise a single lens for capturing sequential images one at a time. In some embodiments, the captured image may include 2D images, such as 2D images 104. In some embodiments, other data may also be obtained from the camera and/or user, including location information, such as location information 106, as well as depth information.

At step 1003, transformations between adjacent frames in the sequence of images are calculated. Various transformation parameters may be identified and tracked to calculate transformations between frames, such as 2D translation, 2D Euclidean, similarity 2D, affine, and/or homography. For example, a 2D translation matrix may be generated by tracking translation along two axes, such as an x axis and a y axis. Tracking 2D rotation and translation along two axes may be used to generate a 2D Euclidean matrix. Similarity 2D matrix may be generated by additionally tracking 2D scale. Affine transformation may use six parameters, including translation, rotation, scale, and shear. Homographic transformation may include eight parameters.

Figure 11:
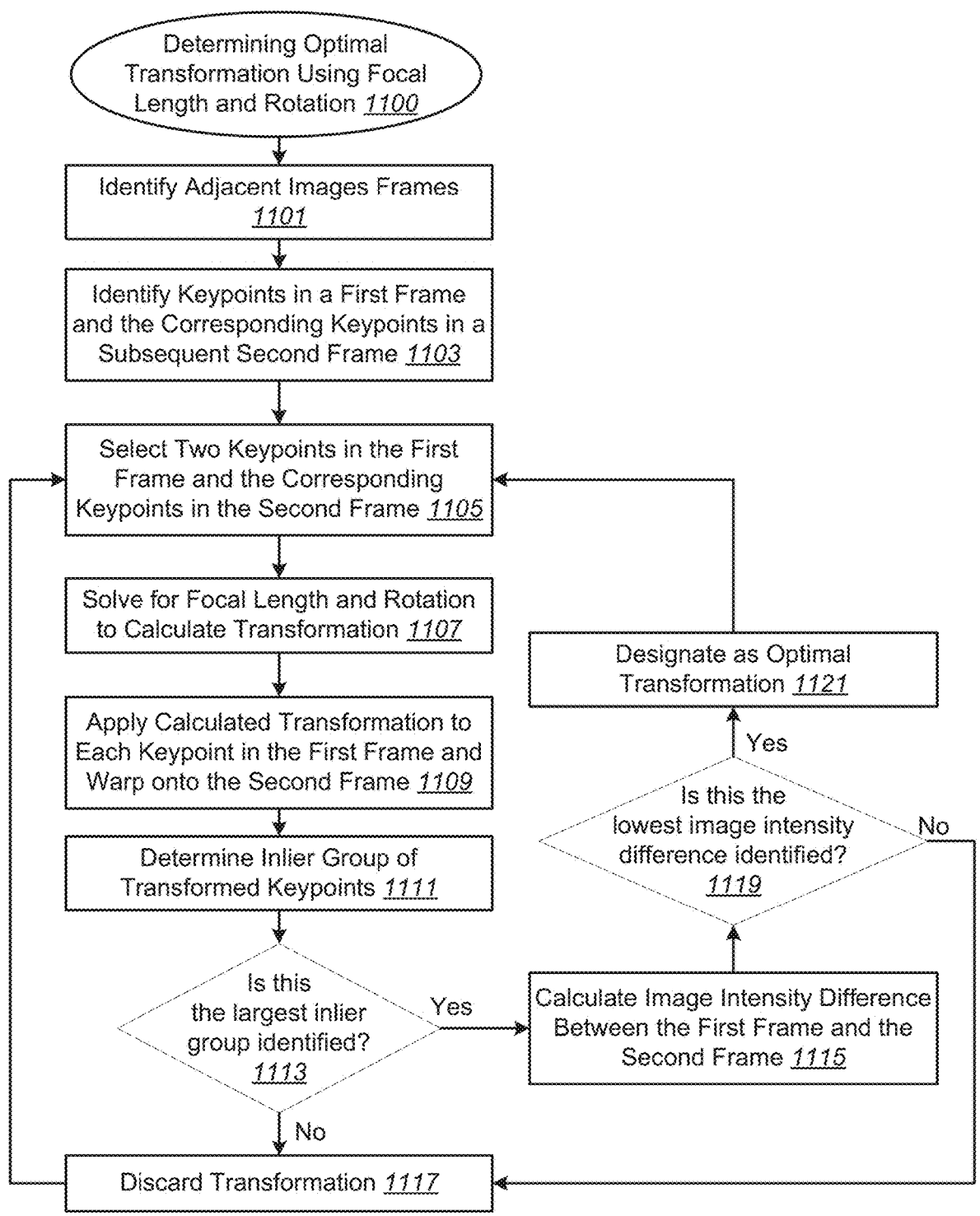
FIG. 11 illustrates an example method for determining the optimal transformation using focal length and rotation as parameters, in accordance with one or more embodiments.

According to various embodiments, calculating the transformation between adjacent frames includes determining the optimal transformation using focal length and rotation as parameters, as further described in FIG. 11. The optimal transformation may be a transformation that, when applied to a first frame, results in the largest inlier group of keypoints and/or lowest image intensity difference between the first frame and an adjacent second frame.

At step 1005, the transformations are composed into a trajectory, which may be smoothed at step 1007. In some embodiments, the trajectory is smoothed into a polynomial or linear model. At step 1009, the calculated transformations are offset to fit the smooth trajectory. Once the transformations are applied to the image frames, the sequence of images may be viewed without distortions or unwanted movements and/or blurring. The transformed image frames may be considered artificial image frames.

With reference to FIG. 11, shown is an example method 1100 for determining the optimal transformation using focal length and rotation as parameters, in accordance with one or more embodiments. In some embodiments, method 1100 is implemented to calculate the transformations between adjacent frames in a sequence of images, as previously mentioned at step 1003.

At step 1101, adjacent image frames are identified. For example, a first image frame N and a subsequent image frame N+1 may be identified. In some embodiments, the image frames N and N+1 may be part of a sequence of images captured at step 1001. In various embodiments, adjacent image frames may be consecutively captured images in time and/or space. In some embodiments, image frames identified at step 1101 may not be adjacent frames, but may be frames separated by one or more other frames. A RANSAC (random sample consensus) algorithm may be implemented to determine the optimal transformation between the adjacent image frames. As described herein, focal length and rotation may be identified from keypoints tracked from a first frame to a second frame. Various transformations may be calculated from these parameters gathered from various combinations of keypoints and applied to the first frame and/or the second frame. The number of inlier keypoints and/or image intensity difference between the two frames is determined after a transformation has been applied. The RANSAC algorithm may test a predetermined number of calculated transformations as such, to determine an optimal transformation resulting in the largest number of inlier keypoints and/or a minimal image intensity difference.

At step 1103, keypoints in the first frame and corresponding keypoints in the subsequent second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Förstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 1105, two keypoints in the first frame and the corresponding keypoints in the second frame are selected. In some embodiments, the two keypoints in the first frame may be selected randomly by the RANSAC algorithm. The two corresponding keypoints in the second frame may be identified by the KLT feature tracker. In some embodiments, two keypoints may be randomly selected in the second frame and the corresponding keypoints in the first frame are identified. Each pair of corresponding keypoints may be referred to herein as a correspondence. For example, keypoint A on frame N and keypoint A' on frame N+1 correspond to each other via KLT feature tracking and may comprise a pair (A, A'). A second correspondence (B, B') may be selected at step 1105 which comprises keypoint B on frame N and keypoint B' on frame N+1.

Based on the two keypoint correspondences, the focal length and rotation are solved to calculate the transformation at step 1107. In other words, a transformation, T1, between the first frame and second frame may be calculated from the two corresponding pairs of keypoints using a predetermined algorithm. For example, a mathematical model may be used, such as that provided in M. Brown, R. Hartley, and D. Nister. Minimal solutions for panoramic stitching. In Proceedings of the International Conference on Computer Vision and Pattern Recognition (CVPR07), Minneapolis, June 2007. In order to calculate a transformation based on rotation and focal length, four parameters are required: three for rotation and one for focal length. Each correspondence of a keypoint between frames provides two constraints. Thus, four constraints can be provided by the two correspondences for each selected keypoints between frames. The derived close-form solution is the calculated transformation based on the two selected keypoints.

At step 1109, the calculated transformation T1 is applied to each keypoint in the first frame which is warped onto the second frame. In other words, all keypoints in the first frame are transformed to the second image via applying the calculated transformation. The transformation is reversible and in some embodiments, the keypoints in the second frame may be transformed onto the first frame after the calculated transformation is applied to keypoints in the second frame.

At step 1111, an inlier group of transformed keypoints is determined. In some embodiments, a transformed keypoint in the first frame is considered an inlier if the transformation T1 correctly transforms the keypoint to match the corresponding keypoint in the second frame. In some embodiments, this can be determined by computing the L2 distance between a transformed keypoint and its corresponding keypoint on the second image. For example, a transformed keypoint on a first frame N may be denoted as $K\hat{}$ and its corresponding keypoint on the second frame N+1 may be denoted as K'. The L2 distance is computed as $\|A\hat{}-A'\|$, which corresponds to the distance between two 2D points. If the distance between any keypoint correspondence is within a predetermined threshold distance in any direction, then the correspondence will be determined to be an inlier. In other words, if the difference between any keypoint correspondence is greater than the predetermined threshold distance, then the keypoint will be determined to be an outlier.

For example, the threshold distance may be a threshold pixel distance, which is the L2 distance between two keypoints in a correspondence. Thus, if the distance between a keypoint K and its corresponding keypoint K' is more than 2 pixels, then that keypoint correspondence will be determined to be an outlier based on the transformation applied at step 1109. In various embodiments, the threshold pixel distance may be a function of image resolution and can scale linearly. For example, method 1100 may be processing images at a 320×180 pixels resolution and use a threshold pixel distance of 2 pixels. However, if method 1100 is used to process images at a 1080p (1920×1080 pixels) resolution, then a threshold pixel distance of 6-8 pixels may be used. In some embodiments, a different threshold pixel distance may be chosen for a given image resolution. In some embodiments, the threshold pixel distance may be empirically determined based on experimental results of accuracy.

After all keypoint correspondences have been measured as such, it is determined whether the calculated transformation T1 resulted in the largest inlier group identified, at step 1113. If the transformation T1 applied at step 1109 does not result in the largest group of inlier keypoints, the calculated transformation T1 is discarded at step 1117. In other words, if a larger inlier group was identified based on a previous transformation, T0, calculated at step 1107 and applied at step 1109, then the current calculated transformation T1 is discarded. If the transformation T1 calculated at step 1107 is the first calculated transformation within the RANSAC algorithm, then it necessarily results in the largest group of inlier keypoints and the transformation data will be stored for comparison with subsequently calculated transformations.

If the calculated transformation T1 applied at step 1109 does result in the largest group of inlier keypoints, the image intensity difference between the first frame and the second frame is calculated at step 1115. In some embodiments, the calculated transformation T1 may be applied to every pixel in the first frame to warp the first frame onto the second frame, and an image intensity difference is calculated between the transformed first frame and the second frame. For example, an error or difference for each color channel is calculated between each corresponding pixel in the two frames. Then an average error of the RGB value of all color channels is derived for each pixel. Next, the average error for all pixels within the first and second frames is calculated. In some embodiments, the image intensity difference between two frames will be between 0 and 255. A lower image intensity difference value corresponds to a closer image match between frames, and consequently a more accurate transformation.

There may be instances where a larger inlier group is determined at step 1113, but a higher image intensity difference value is calculated at step 1115. In this instance, the transformation resulting in the higher image intensity difference value will be discarded. Alternatively, the transformation resulting in the larger inlier group may be stored in some embodiments. Such instances are more likely to occur in instances where stabilization of foreground is desired in image frames that include large textured background regions. Accordingly, the RANSAC algorithm may result in calculated transformations that include large inlier keypoint sets that correspond to the large background, instead of the foreground. This may result in higher intensity error in the foreground region. To compensate for this in some embodiments, the RANSAC algorithm may measure focal length and rotation using only keypoints located in the foreground of an image. A background keypoint removal may be performed on the image frames within a sequence of images before the RANSAC algorithm is implemented. Keypoints corresponding to the background of an image may be identified based on IMU data to calculate how such keypoints with focal points at infinity should move between frames. Once identified, such background keypoints are removed, such that the RANSAC algorithm calculated transformations at step 1107 using only keypoints corresponding to the foreground. This may reduce undesired transformations resulting in larger inlier groups (aligning the background), but higher image intensity difference values (from unaligned foreground). Such background keypoint removal may also be used with concave surround views, such as the surround view depicted in FIG. 6B. In convex panoramic surround views, calculating transformations from keypoints corresponding to the background and the foreground may be desired.

It is then determined whether the calculated image intensity difference is the lowest image intensity difference identified at 1119. If a lower image intensity difference was determined from a previous transformation, such as T0, calculated at step 1107, then the current transformation T1 is discarded at 1117, and another two keypoint correspondences may be randomly selected at step 1105. If however, the image intensity difference for the present transformation T1 is determined to be the lowest out of all previously determined image intensity differences for prior transformations, then the current transformation is designated as the optimal transformation for the first and second frames at step 1121.

In some embodiments, step 1115 is only implemented if a larger inlier group is determined at 1113. The transformation calculated at step 1107 in a first iteration of the RANSAC algorithm would necessarily result in the largest inlier group. In other embodiments, step 1115 may be implemented if the inlier group determined at 1113 is at least equal to the largest inlier group resulting from a previous transformation. In rare instances, a subsequent transformation calculated at step 1107 may result in the same inlier group size, as well as the same image intensity difference. In such instance, the transformation calculated first may be kept while the second transformation is discarded at step 1117. In other embodiments, the subsequent transformation is kept while the previous transformation discarded.

The method 1100 may then return to step 1105 to select another two correspondence of keypoint pairs. Such keypoint correspondences may include another randomly selected pair of keypoints in the first frame. In some instances, randomly selected keypoint correpsondences may be correspondences that were previously selected at step 1105. For example, correspondence (A, A') and a third corresponding keypoint pair (C, C') may be selected in the second iteration of the RANSAC algorithm. In even rarer occasions, the same exact keypoint pairs may be selected in subsequent iterations of the RANSAC algorithm. For example, a subsequent iteration of the RANSAC algorithm may again select correspondences (A, A') and (B, B'). In this case, the resulting inlier group size and calculated image intensity difference would be identical to the previously calculated transformation based on the previous iteration. In this instance, the first transformation will be kept and the subsequent iteration involving the same calculated transformation will be discarded. However, the probability of such occurrence may be very unlikely depending on the number of keypoints identified on an image frame, for example, 1,000 keypoints. Thus, the chance occurrence of this instance can simply be ignored.

The RANSAC algorithm of method 1100 may continue for any number of predetermined cycles. For example, the RANSAC algorithm may perform steps 1105 through 1117 one hundred times for two adjacent frames. However, the RANSAC algorithm may be performed any number of cycles desired. The result of method 1100 is an optimal transformation between the first frame and the second frame, which results in the largest amount of inlier keypoints and the lowest image intensity difference when the transformation is applied to the first frame and warped onto the second frame, or vice versa. The optimal transformation between the two adjacent frames may then be used to compose a trajectory for the image sequence at step 1005 of method 1000.

As previously described, using focal length and camera rotation as stabilization parameters has a clear physical mean. In other words, given the captured video sequence, each image represents a three-dimensional camera location of a camera in a three-dimensional world, the video stabilization problem is modeled as how to rotate and zoom these set of cameras in three-dimensional space in order to produce a spatially smooth video footage from the original captured sequence. Because, the image warp is mapped from physically meaningful parameters (focal length and camera rotation), the warped image will follow optical rules of physics, and the stabilized video output will be optically correct and free from unsound distortion. Moreover, unlike existing methods of image stabilization, such image stabilization by methods described herein may be implemented to stabilize image sequences captured during concave camera translation, such as for a concave surround view, as well as for convex panoramic views. Additionally, unlike existing methods of image stabilization, such image stabilization, as described herein, may also stabilize image sequences corresponding to movement in 3D space.

Figure 12A:
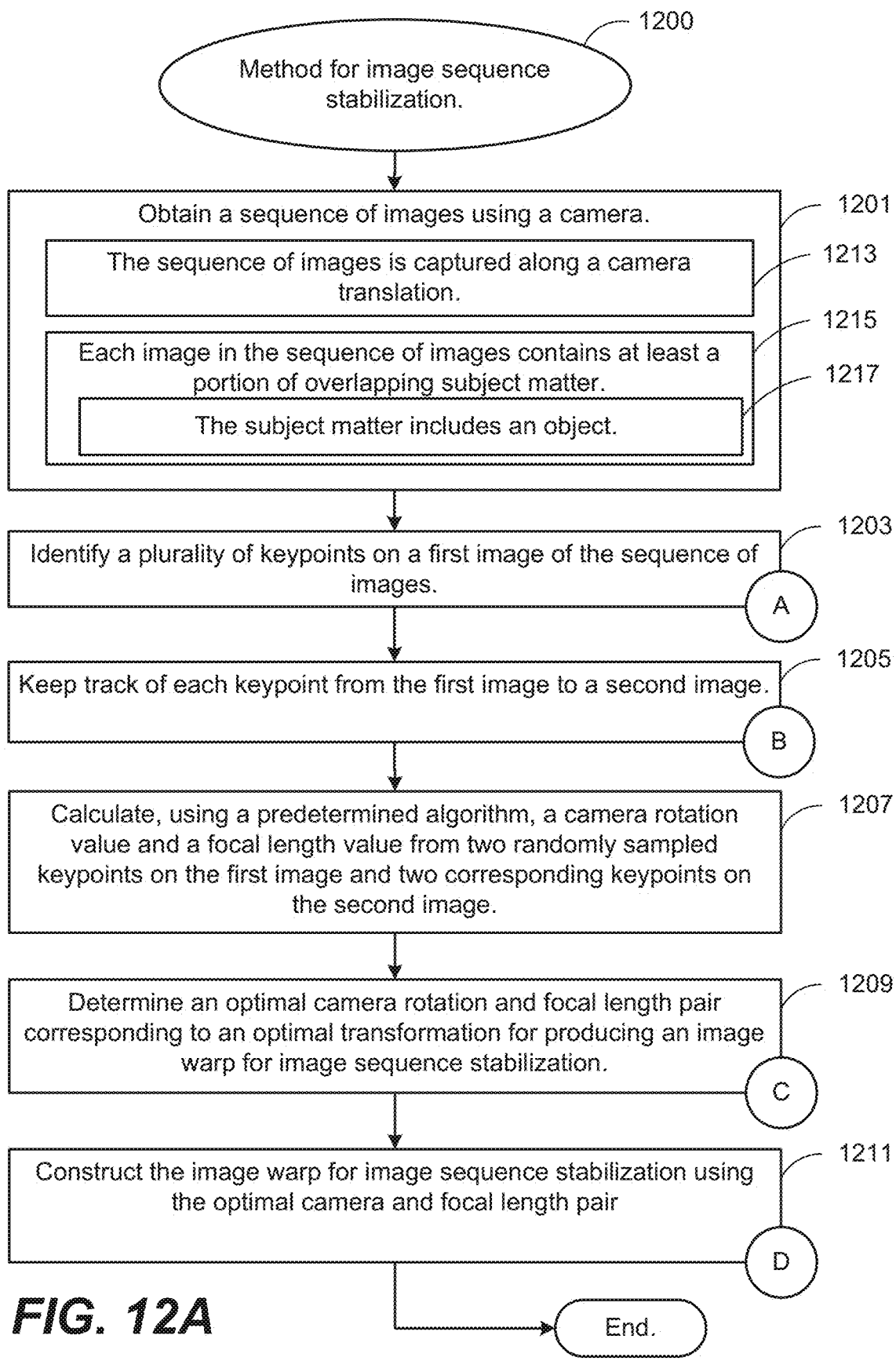
FIGS. 12A and 12B illustrate an example method for image sequence stabilization, in accordance with various embodiments.
Figure 12B:
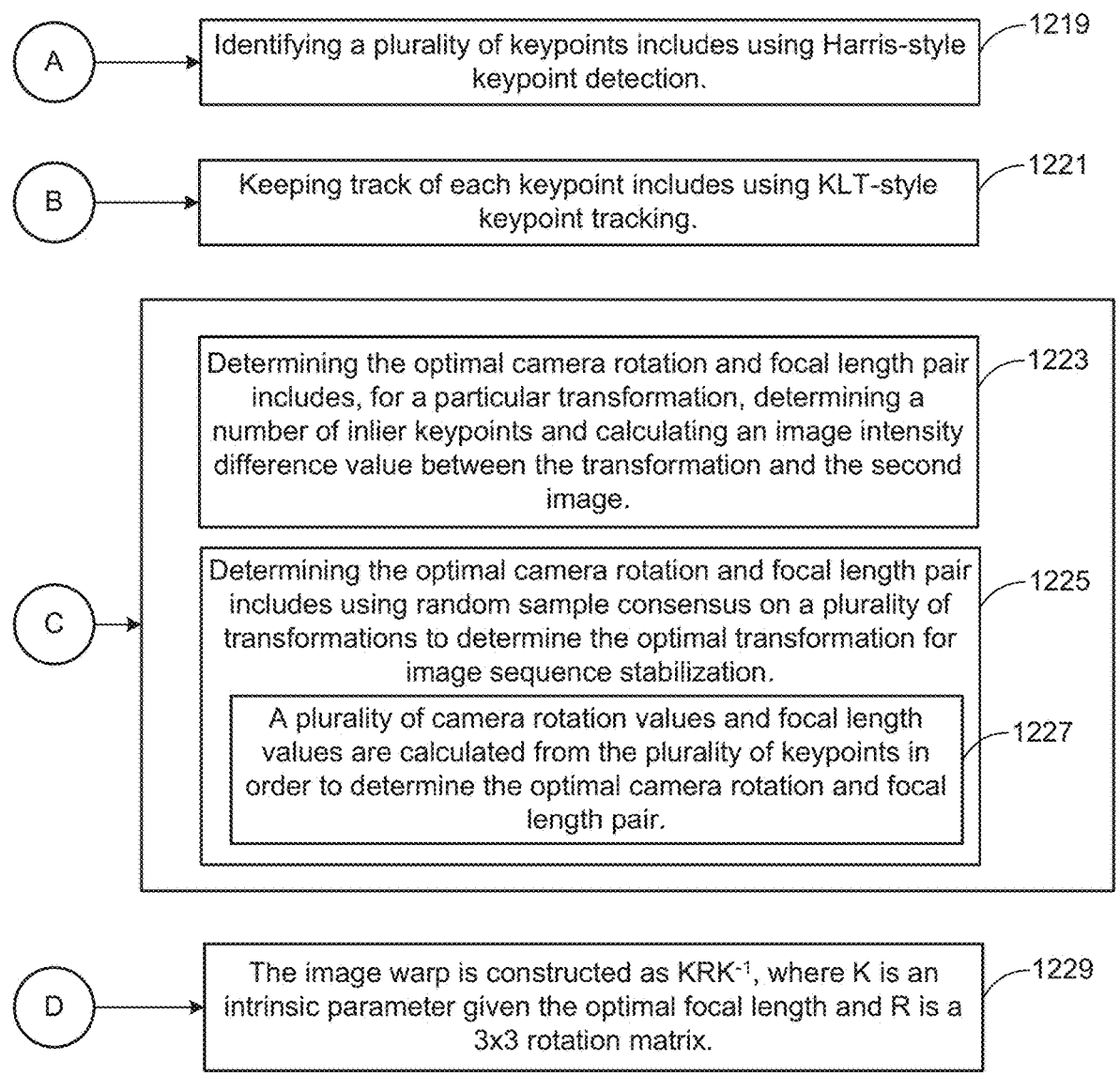

With reference to FIGS. 12A and 12B, shown is an example method 1200 for image sequence stabilization, in accordance with various embodiments. In some embodiments, method 1200 utilizes focal length and rotation as parameters, such as described in method 1100.

At operation 1201, a sequence of images is obtained using a camera, such as in step 1001. In some embodiments, the sequence of images is captured along a camera translation 1213. For example, the camera translation 1213 may be any combination of one or more of the camera motions previously described with reference to FIGS. 3 and 6A-6E. As an example, the camera translation 1105 may be a concave arc movement capturing a concave surround view, such as in FIGS. 3, 6B, and 6D. In some embodiments, each image in the sequence of images contains at least a portion of overlapping subject matter 1215. In some embodiments, the subject matter 1215 includes an object 1217. For example, object 1217 may be an object of interest 308, as described in FIG. 3, or other content, such as content 404. In some embodiments, the subject matter 1215 may additionally, and/or alternatively, include context scenery surrounding objects 310, as described in FIG. 3, or other context, such as context 406.

In some embodiments, each image in the sequence of images is captured at a predetermined distance along the camera translation 1213. For example, the camera may capture an image at every 60 mm of camera translation along an arc and/or line. In other embodiments, the sequence of images may be captured at predetermined time intervals. For example, images may be captured by the camera at a frame rate of 14 to 26 frames per second. In other embodiments, the sequence of images captured by the camera may be stored as a video file.

In some embodiments, the sequence of images are fused to generate a surround view of the object 1217, such as in step 208. As previously described, the surround view 208 may depict a three-dimensional view of the object 1217 without actually generating a three-dimensional model of the object 1217. In some embodiments, the three-dimensional view of the object 1217 presents the object 1217 as a three-dimensional model using only the two-dimensional images captured. Thus, there is no requirement to store a rendered three-dimensional model.

At operation 1203, a plurality of keypoints identified on a first image of the sequence of images, such as in step 1103. In some embodiments, identifying a plurality of keypoints includes using a Harris-style keypoint detection 1219. As previously described, Harris-style corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame.

At operation 1205, each keypoint from the first image is kept track of to a second image. In some embodiments, keeping track of each keypoint includes using KLT-style keypoint tracking 1221, such as previously described in step 110. For example, the 1,000 keypoints on the second frame which correspond to the 1,000 keypointin the first frame identified at operation 1203 can then be identified using a KLT feature tracker to track keypoints between the two image frames.

At operation 1207, a predetermined algorithm is used to calculate a camera rotation value and a focal length value from two randomly sampled keypoints on the first image and two corresponding keypoints on the second image. As previously described with respect to step 1107 in FIG. 11, the focal length and rotation can solved to calculate the transformation between the first and second frames. By using a known theoretical proof, two pairs of corresponding keypoints. Each correspondence of a keypoint provides two constraints of the four constraints needed to solve for focal length and rotation. A transformation may then be determined from the pair of calculated camera rotation and focal length values may correspond to a transformation.

At operation 1209, an optimal camera rotation and focal length pair 1223 are determined, which correspond to an optimal transformation for producing an image warp 1229 for image sequence stabilization. As previously described in steps 1109 through 1117 in FIG. 11, in some embodiments, determining the optimal camera rotation and focal length pair 1223 includes, for a particular transformation, determining a number of inlier keypoints and calculating an image intensity difference value between the transformation and the second image. For example, the transformation, determined at operation 1207 from the calculated camera rotation and focal length value pair, may be applied to the 1,000 keypoints in the first frame. In some embodiments, the transformation determined at operation 1207 is reversible. In other words, the determined transformation may be applied to the keypoints in the second frame, which are then matched to the corresponding points in the first frame.

Each transformed keypoint may then be compared to its corresponding keypoint in the second frame to determine the effectiveness of the transformation. A transformed keypoint is an inlier keypoint if it is determined to match its corresponding keypoint in the second frame. As previously explained in in step 1111, an inlier keypoint can be identified by computing the difference between the pixels in the transformed keypoint of the first frame and the corresponding keypoint in the second frame. If the difference between any pixel in the keypoint correspondence is within a predetermined threshold distance in any direction, then the keypoint will be determined to be an inlier. In other words, if the difference between any pixel in the keypoint correspondence is greater than the predetermined threshold distance, then the keypoint will be determined to be an outlier. Thus, in the current example, every transformed keypoint of the 1,000 keypoints in the first frame is determined to be an inlier or an outlier.

The transformation determined at operation 1207 may further be applied to every pixel within the first frame to determine the image intensity difference, as previously described with reference to step 1115 in FIG. 11. As previously explained the transformation may be reversible and applied to the pixels in the second frame. The transformed pixels are then compared to the corresponding pixels in the other frame. As described in step 1115, the image intensity difference value is calculated by finding the average error or difference of the RGB value of all color channels for each pixel, and then deriving an average error for all pixels within the first and second frames is calculated. For example, the image intensity difference between two frames will be between 0 and 255. A lower image intensity difference value corresponds to a closer image match between frames, and consequently a more accurate transformation.

In some embodiments, determining the optimal camera rotation and focal length pair 1223 includes using random sample consensus 1225 on a plurality of transformations to determine the optimal transformation for image sequence stabilization. In some embodiments a plurality of camera rotation values and focal length values are calculated (1227) from the plurality of keypoints in order to determine the optimal camera rotation and focal length pair 1223. For example, a RANSAC algorithm may be implemented to perform the random sample consensus 1225. In some embodiments, the RANSAC algorithm may be implemented to randomly select two keypoints in operation 1207.

In some embodiments, the optimal camera rotation and focal length pair 1223 corresponds to the transformation resulting in the largest inlier group with the smallest image intensity difference. In some embodiments, the image intensity value is only determined if the given transformation results in a larger inlier group than a previously determined transformation, as described with reference to step 1113 in FIG. 11. If a given transformation results in a smaller inlier group, then that transformation is discarded. However, in other embodiments the image intensity difference value may be determined regardless of the size of the resulting inlier group. In yet further embodiments, the optimal camera rotation and focal length pair 1223 may correspond to only the transformation resulting in the smallest image intensity difference. In other words, method 1200 may not determine the size of an inlier group of keypoints. For example, once a transformation is calculated at step 1207, the transformation may be directly applied to the entire image of the first frame. As another example, with reference to FIG. 11, steps 1109, 1111, and 1113 in method 1100 may be bypassed.

The RANSAC algorithm may be implemented to run operations 1207 and 1209 a predetermined number of times to determine the optimal camera rotation and focal length pair 1223, which corresponds to an optimal transformation between the first image and the second image. For example, operations 1207 and 1209 may be set to run 1,000 times, and the camera rotation and focal length pair resulting in the largest inlier group with the smallest image intensity difference is determined to be the optimal transformation.

At operation 1211, the image warp 1229 for image sequence stabilization is constructed using the optimal camera and focal length pair 1223. In some embodiments, the image warp 1229 is constructed as $KRK^{-1}$, where K is an intrinsic parameter given the optimal focal length, and R is a 3×3 rotation matrix. K is a 3×3 focal length matrix, and $K^{-1}$ is the inverse matrix of K. R may be a special orthogonal group 3, or SO(3), matrix.

An image warp 1229 may be constructed for the transition between each image in the image sequence to create a smooth trajectory which is used to offset a transformation between images with the corresponding image warp 1229, such as described in steps 1005, 1007, and 1009 in FIG. 10. Because the image warps 1229 are mapped from physically meaningful parameters of focal length and rotation, the warped images will follow the optical rules of physics. Unlike image stabilization with current methods, a user viewing the image sequence will not experience any unpleasant distortions. Furthermore, such image stabilization in method 1200 provides for image stabilization of a sequence of images comprising surround view of an object from multiple angles.

The methods presented in this disclosure are highly efficient and can be run on a mobile platform in real-time. The various methods require only very small amounts of additional data and are therefore extremely well-suited for data that needs to be sent over a wireless network (e.g. LTE). In addition, the methods are sufficiently regularized to handle problematic cases without creating jarring artifacts. Accordingly, the methods described herein are suitable for generating artificially rendered images on mobile devices, etc.

Various computing devices can implement the methods described. For instance, a mobile device, computer system, etc. can be used to generate artificially rendered images. With reference to FIG. 13, shown is a particular example of a computer system 1300 that can be used to implement particular examples of the present disclosure. For instance, the computer system 1300 can be used to provide generate artificially rendered images according to various embodiments described above. In addition, the computer system 1300 shown can represent a computing system on a mobile device. According to particular example embodiments, a system 1300 suitable for implementing particular embodiments of the present disclosure includes a processor 1301, a memory 1303, an interface 1311, and a bus 1315 (e.g., a PCI bus). The interface 1311 may include separate input and output interfaces, or may be a unified interface supporting both operations. When acting under the control of appropriate software or firmware, the processor 1301 is responsible for such tasks such as optimization. Various specially configured devices can also be used in place of a processor 1301 or in addition to processor 1301. The complete implementation can also be done in custom hardware. The interface 1311 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1300 uses memory 1303 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method for image sequence stabilization, the method including:
   moving a mobile device through space in a locally convex or locally concave motion;
   obtaining a sequence of images using a camera on the mobile device, the sequence of images being captured along a camera translation, wherein each image in the sequence of images contains at least a portion of overlapping subject matter, the subject matter including an object; and
   stabilizing, via a processor, each image in the sequence of images using an optimal image warp based on an optimal camera rotation value and an optimal focal length value, wherein the stabilizing includes:
      identifying a plurality of keypoints on a first image of the sequence of images;
      keeping track of each keypoint from the first image to a second image;
      calculating, using a predetermined algorithm, a camera rotation value and a focal length value from two randomly sampled keypoints on the first image and two corresponding keypoints on the second image;
      calculating a plurality of transformations between the first image and the second image;
      determining an optimal transformation from the plurality of transformations for producing the optimal image warp, wherein determining the optimal transformation involves sequentially testing transformations of the plurality of transformations by 1) determining if a current transformation results in the largest inlier group of keypoints compared to a previously selected transformation and 2) next, determining if the current transformation resulting in the largest inlier group of keypoints also results in the lowest image intensity difference between the first image and the second image compared to the previously selected transformation,
         wherein if the current transformation does not result in a larger inlier group of keypoints than the previously selected transformation, the current transformation is not tested for image intensity difference,
         wherein if the current transformation results in a larger inlier group of keypoints than the previously selected transformation and results in a higher image intensity difference, the previously selected transformation is discarded and the current transformation replaces the selected transformation for the next sequential test, and otherwise the current transformation is discarded,
      wherein inlier keypoints are determined by calculating a pixel distance between a transformed keypoint of the first image and a corresponding keypoint on the second image, wherein a transformed keypoint is labeled an inlier if the pixel distance calculated is less than a pixel distance threshold, wherein the pixel distance threshold is a function of image resolution of the first and second images,
      wherein image intensity difference is determined by: 1) applying a transformation to every pixel in the first image to warp the first image onto the second image, 2) calculating an error or difference for each color channel between each corresponding pixel in the first and second image, 3) deriving an average error of the RGB value of all color channels for each pixel, and 4) calculating the average error for all pixels within the first and second image, wherein image intensity difference between the first and second image is a value between 0 and 255;
      determining the optimal camera rotation and focal length pair corresponding to the optimal transformation for producing the optimal image warp for image sequence stabilization;
      constructing the optimal image warp for image sequence stabilization using the optimal camera and focal length pair; and
      applying the optimal image warp to the sequence of images by composing optimal transformations into a trajectory, wherein the trajectory is smoothed into a polynomial or linear model.

2. The method of claim 1, wherein identifying a plurality of keypoints includes using Harris-style keypoint detection.

3. The method of claim 1, wherein keeping track of each keypoint includes using Kanade-Lucas-Tomasi-style (KLT-style) keypoint tracking.

4. The method of claim 1, wherein the calculated transformations are offset to fit the smooth trajectory.

5. The method of claim 1, wherein determining the optimal camera rotation and focal length pair includes using random sample consensus on a plurality of transformations to determine the optimal transformation for image sequence stabilization.

6. The method of claim 1, wherein a plurality of camera rotation values and focal length values are calculated from the plurality of keypoints in order to determine the optimal camera rotation and focal length pair.

7. The method of claim 1, wherein the image warp is constructed as $KRK^{-1}$, where K is an intrinsic parameter given the optimal focal length, and R is a 3×3 rotation matrix.

8. A system for image sequence stabilization, the system comprising:
   a camera,
   a processor, and
   memory storing one or more programs configured for execution by the processor, the one or more programs comprising instructions for:
      obtaining a sequence of images using a camera, the sequence of images being captured along a camera translation, wherein each image in the sequence of images contains at least a portion of overlapping subject matter, the subject matter including an object, the sequence of images being obtained via moving a mobile device through space in a locally convex or locally concave motion; and stabilizing each image in the sequence of images using an optimal image warp based on an optimal camera rotation value and an optimal focal length value, wherein the stabilizing includes:

identifying a plurality of keypoints on a first image of the sequence of images;

keeping track of each keypoint from the first image to a second image;

calculating, using a predetermined algorithm, a camera rotation value and a focal length value from two randomly sampled keypoints on the first image and two corresponding keypoints on the second image;

calculating a plurality of transformations between the first image and the second image;

determining an optimal transformation from the plurality of transformations for producing the optimal image warp, wherein determining the optimal transformation involves sequentially testing transformations of the plurality of transformations by 1) determining if a current transformation results in the largest inlier group of keypoints compared to a previously selected transformation and 2) next, determining if the current transformation resulting in the largest inlier group of keypoints also results in the lowest image intensity difference between the first image and the second image compared to the previously selected transformation, wherein if the current transformation does not result in a larger inlier group of keypoints than the previously selected transformation, the current transformation is not tested for image intensity difference, wherein if the current transformation results in a larger inlier group of keypoints than the previously selected transformation and results in a higher image intensity difference, the previously selected transformation is discarded and the current transformation replaces the selected transformation for the next sequential test, and otherwise the current transformation is discarded, wherein inlier keypoints are determined by calculating a pixel distance between a transformed keypoint of the first image and a corresponding keypoint on the second image, wherein a transformed keypoint is labeled an inlier if the pixel distance calculated is less than a pixel distance threshold, wherein the pixel distance threshold is a function of image resolution of the first and second images, wherein image intensity difference is determined by: 1) applying a transformation to every pixel in the first image to warp the first image onto the second image, 2) calculating an error or difference for each color channel between each corresponding pixel in the first and second image, 3) deriving an average error of the RGB value of all color channels for each pixel, and 4) calculating the average error for all pixels within the first and second image, wherein image intensity difference between the first and second image is a value between 0 and 255;

determining the optimal camera rotation and focal length pair corresponding to the optimal transformation for producing the optimal image warp for image sequence stabilization;

constructing the optimal image warp for image sequence stabilization using the optimal camera and focal length pair; and applying the optimal image warp to the sequence of images by composing optimal transformations into a trajectory, wherein the trajectory is smoothed into a polynomial or linear model.

9. The system of claim 8, wherein identifying a plurality of keypoints includes using Harris-style keypoint detection.

10. The system of claim 8, wherein keeping track of each keypoint includes using Kanade-Lucas-Tomasi-style (KLT-style) keypoint tracking.

11. The system of claim 8, wherein the calculated transformations are offset to fit the smooth trajectory.

12. The system of claim 8, wherein determining the optimal camera rotation and focal length pair includes using random sample consensus on a plurality of transformations to determine the optimal transformation for image sequence stabilization.

13. The system of claim 8, wherein a plurality of camera rotation values and focal length values are calculated from the plurality of keypoints in order to determine the optimal camera rotation and focal length pair.

14. The system of claim 8, wherein the image warp is constructed as $KRK^{-1}$, where K is an intrinsic parameter given the optimal focal length, and R is a 3×3 rotation matrix.

15. A non-transitory computer readable medium storing one or more programs configured for execution by a computer, the one or more programs comprising instructions for:

obtaining a sequence of images using a camera, the sequence of images being captured along a camera translation, wherein each image in the sequence of images contains at least a portion of overlapping subject matter, the subject matter including an object, the sequence of images being obtained via moving a mobile device through space in a locally convex or locally concave motion; and stabilizing each image in the sequence of images using an optimal image warp based on an optimal camera rotation value and an optimal focal length value, wherein the stabilizing includes:

identifying a plurality of keypoints on a first image of the sequence of images;

keeping track of each keypoint from the first image to a second image;

calculating, using a predetermined algorithm, a camera rotation value and a focal length value from two randomly sampled keypoints on the first image and two corresponding keypoints on the second image;

calculating a plurality of transformations between the first image and the second image;

determining an optimal transformation from the plurality of transformations for producing the optimal image warp, wherein determining the optimal transformation involves sequentially testing transformations of the plurality of transformations by 1) determining if a current transformation results in the largest inlier group of keypoints compared to a previously selected transformation and 2) next, determining if the current transformation resulting in the largest inlier group of keypoints also results in the lowest image intensity difference between the first image and the second image compared to the previously selected transformation, wherein if the current transformation does not result in a larger inlier group of keypoints than the previously selected transformation, the current transformation is not tested for image intensity difference, wherein if the current transformation results in a larger inlier group of keypoints than the previously selected transformation and results in a higher image intensity difference, the previously selected transformation is discarded and the current transformation replaces the selected transformation for the next sequential test, and otherwise the current transformation is discarded, wherein inlier keypoints are determined by calculating a pixel distance between a transformed keypoint of the first image and a corresponding keypoint on the second image, wherein a transformed keypoint is labeled an inlier if the pixel distance calculated is less than a pixel distance threshold, wherein the pixel distance threshold is a function of image resolution of the first and second images, wherein image intensity difference is determined by:
1) applying a transformation to every pixel in the first image to warp the first image onto the second image, 2) calculating an error or difference for each color channel between each corresponding pixel in the first and second image, 3) deriving an average error of the RGB value of all color channels for each pixel, and 4) calculating the average error for all pixels within the first and second image, wherein image intensity difference between the first and second image is a value between 0 and 255;

determining the optimal camera rotation and focal length pair corresponding to the optimal transformation for producing the optimal image warp for image sequence stabilization;

constructing the optimal image warp for image sequence stabilization using the optimal camera and focal length pair; and applying the optimal image warp to the sequence of images by composing optimal transformations into a trajectory, wherein the trajectory is smoothed into a polynomial or linear model.

16. The non-transitory computer readable medium of claim 15, wherein identifying a plurality of keypoints includes using Harris-style keypoint detection.

17. The non-transitory computer readable medium of claim 15, wherein keeping track of each keypoint includes using Kanade-Lucas-Tomasi-style (KLT-style) keypoint tracking.

18. The non-transitory computer readable medium of claim 15, wherein the calculated transformations are offset to fit the smooth trajectory.

19. The non-transitory computer readable medium of claim 15, wherein determining the optimal camera rotation and focal length pair includes using random sample consensus on a plurality of transformations to determine the optimal transformation for image sequence stabilization.

20. The non-transitory computer readable medium of claim 15, wherein the image warp is constructed as $KRK^{-1}$, where K is an intrinsic parameter given the optimal focal length, and R is a 3×3 rotation matrix.

* * * * *